US008495807B2

(12) United States Patent
Szewc et al.

(10) Patent No.: US 8,495,807 B2
(45) Date of Patent: Jul. 30, 2013

(54) RETRACTABLE PREWINDER ASSEMBLY WITH INFINITE ADJUSTABILITY FOR INSTALLATION OF HELICALLY COILED WIRE INSERTS

(75) Inventors: Jan Szewc, Roxbury, CT (US); William Giannakakos, Danbury, CT (US); William J. Lutkus, Watertown, CT (US); Anthony Graham, Carmel, NY (US)

(73) Assignee: Newfrey LLC, Newark, DE (US)

( * ) Notice: Subject to any disclaimer, the term of this patent is extended or adjusted under 35 U.S.C. 154(b) by 1063 days.

(21) Appl. No.: 12/491,626

(22) Filed: Jun. 25, 2009

(65) Prior Publication Data

US 2010/0325857 A1 Dec. 30, 2010

(51) Int. Cl.

| | |
|---|---|
| ***B23P 11/00*** | (2006.01) |
| ***B23Q 17/00*** | (2006.01) |
| ***B25B 17/00*** | (2006.01) |
| ***B25B 21/00*** | (2006.01) |
| ***E02D 7/02*** | (2006.01) |
| *B23P 19/04* | (2006.01) |

(52) U.S. Cl.
USPC ......... 29/240.5; 29/407.05; 81/57.11; 173/48

(58) Field of Classification Search
USPC .............. 29/240.5, 407.05; 81/57.11; 173/38, 173/48
See application file for complete search history.

(56) References Cited

U.S. PATENT DOCUMENTS 2,316,231 A * 4/1943 Evans .......................... 29/240.5
2,371,622 A 3/1945 Hawkins
2,390,545 A 12/1945 Lang
2,400,548 A 5/1946 Geertsema
2,453,840 A 11/1948 Geertsema
2,584,118 A 2/1952 Forster
2,586,805 A 2/1952 Forster
2,594,901 A * 4/1952 Forster ............................ 173/31
2,731,992 A 1/1956 Lozon
2,855,661 A * 10/1958 Forster ......................... 29/240.5
2,997,782 A 8/1961 Eddy
3,052,972 A * 9/1962 Steinmeyer .................. 29/240.5
3,093,895 A 6/1963 Eddy
3,111,751 A 11/1963 Eddy
3,348,293 A 10/1967 Newton et al.
3,357,698 A 12/1967 Flynn
3,579,793 A 5/1971 Williams et al.
3,602,975 A 9/1971 Thurston et al.
4,172,314 A * 10/1979 Berecz et al. ................ 29/240.5
4,528,737 A 7/1985 Cosenza et al.
4,553,302 A 11/1985 Cosenza et al.
4,553,303 A 11/1985 Yamamoto
4,768,270 A 9/1988 Czarnowski
4,980,959 A * 1/1991 Czarnowski ................. 29/240.5
(Continued)

*Primary Examiner* — Lee D Wilson
*Assistant Examiner* — Alvin Grant
(74) *Attorney, Agent, or Firm* — Harness, Dickey & Pierce, P.L.C.

(57) ABSTRACT

A prewinder apparatus attachable to a drive tool to install a helical coil insert includes a body connected to the drive tool. An adapter rotates and is releasably connected to the body at operator selected positions. A prewinder portion displaces in/out of the body. The prewinder portion translates into the body until a fastener engaged with the prewinder portion contacts a stop member defining a predetermined helical coil insert insertion depth. A mandrel axially extends from the prewinder portion when the prewinder portion moves into the body to rotatably insert the helical coil insert. A clutch engages/disengages the mandrel from a drive member. A second clutch or a stall device stalls the drive tool after coil insertion.

19 Claims, 23 Drawing Sheets

U.S. PATENT DOCUMENTS

| | | | | |
|---|---|---|---|---|
| 5,212,865 | A | 5/1993 | Davis et al. | |
| 5,456,145 | A | 10/1995 | Cosenza | |
| 6,000,114 | A | 12/1999 | Newton et al. | |
| 6,321,433 | B1 * | 11/2001 | Cliff et al. | 29/240.5 |
| 6,367,138 | B1 | 4/2002 | Newton et al. | |
| 6,470,557 | B2 | 10/2002 | Newton et al. | |
| 6,704,984 | B2 * | 3/2004 | Szewc et al. | 29/240.5 |
| 6,704,985 | B1 | 3/2004 | Marshall | |
| 6,860,173 | B2 * | 3/2005 | Newton et al. | 81/57.11 |
| 7,340,814 | B2 * | 3/2008 | Bruehwiler et al. | 29/407.04 |
| 7,634,844 | B2 * | 12/2009 | Szewc et al. | 29/240.5 |
| 2007/0245533 | A1 * | 10/2007 | Szewc et al. | 29/240.5 |

* cited by examiner

RETRACTABLE PREWINDER ASSEMBLY WITH INFINITE ADJUSTABILITY FOR INSTALLATION OF HELICALLY COILED WIRE INSERTS

FIELD

The present disclosure relates to devices and methods for installing helically coiled inserts.

BACKGROUND

This section provides background information related to the present disclosure which is not necessarily prior art.

Helically coiled wire inserts both of tanged or tangless design can be inserted using hand tools, electrical, battery powered, or pneumatic tools. Coarse thread size inserts, such as thread sizes 4-40, 6-32, 10-24, ¼-20, etc., are relatively stiff or rigid and can be installed using a predetermined mandrel. Fine thread size inserts, however, such as for thread sizes 4-48, 6-40, 8-36, 10-32, ¼-28, etc., are commonly flexible and may not retain their shape during installation. Fine thread size inserts therefore commonly require a pre-winder to be used in conjunction with a mandrel to help reduce the outside diameter of the inserts and to align the coils of the wire insert to the correct pitch so they can be more easily installed into a tapped aperture of for example a work piece or fastener body. Pre-winders are known for use with hand tools, electric, battery operated, and/or pneumatic power tools, however known pre-winders for these tools for the installation of helically coiled inserts often also require spacers or shims to accommodate differences in insert length or installation depth. Installation of spacers or shims normally requires stocking multiple sizes of parts, with associated additional part costs, time delay in their installation, and defective parts which do not receive the properly installed insert.

The installation of spacers or shims commonly requires disassembly of the tool or prewinder followed by installation of the necessary spacers or shims. The disassembly time further adds costs and time delay to completion of the component. The tool must then be reassembled and tested with the shims and spacers installed. If proper installation depth is not achieved, the process must be repeated until the appropriate shims or inserts are installed to provide the desired coil installation depth. This repetition further increases costs and time delays. An additional problem of know installation tools is providing a positive, repeatable stall position for the motor when the coil has reached an intended installation depth which can cause tool jamming.

SUMMARY

This section provides a general summary of the disclosure, and is not a comprehensive disclosure of its full scope or all of its features.

According to several embodiments of a retractable prewinder assembly of the present disclosure, a prewinder apparatus attached to a drive tool for installation of a helical coil insert includes a body connected to the drive tool. An adapter rotatable with respect to the body is releasably connected to the body at operator selected ones of a plurality of rotated positions. A prewinder portion is slidably displaceable into and out of the body coaxial to a longitudinal axis of the body and the adapter, and biased by a first biasing member toward an extended position. A mandrel is axially extensible from the prewinder portion when the prewinder portion is slidably displaced into the body against a biasing force of the first biasing member. The mandrel is adapted to engage the helical coil insert to rotatably insert the coil insert.

According to other embodiments, a prewinder apparatus selectively attachable to a drive tool for installation of a helical coil insert includes a body connected to the drive tool. An adapter is rotatable with respect to the body and is releasably connected to the body at operator selected ones of a plurality of rotated positions. A prewinder portion is slidably displaceable into and out of the body coaxial to a longitudinal axis of the body and the adapter. The prewinder portion is slidably translatable into the body until a fastener engaged with the prewinder portion contacts a stop member defining a predetermined depth of insertion for the helical coil insert. A mandrel is axially extensible from the prewinder portion when the prewinder portion is slidably displaced into the body. The mandrel is adapted to engage the helical coil insert to rotatably insert the helical coil insert.

According to still other embodiments, a prewinder apparatus attached to a drive tool for installation of a helical coil insert includes a clutch assembly having a stall sleeve having a plurality of inner cavity threads. A stall coupling is both slidably and threadably receivable within an inner bore of the stall sleeve and further includes a plurality of outer perimeter threads adapted to be threadably engaged with the plurality of inner cavity threads of the stall sleeve. A drive socket is connected for rotation to the drive tool and axially translatable within the stall coupling. Upon full threaded engagement of the outer perimeter threads with the inner cavity threads an end face of the stall coupling contacts a wall of the stall sleeve preventing further axial translation of the stall coupling to frictionally stall the drive tool.

According to further embodiments, a stall assembly includes a stall stop member threadably engaged with the body. A stall sleeve is slidably received in the stall stop member. A mandrel drive member having a drive end is adapted to releasably engage with the slot to rotate the mandrel, the mandrel drive member slidably received in the stall sleeve. A stall driver slidably is received within an inner diameter portion of mandrel drive member and having a radially extending flange. A fastener frictionally engaged with the stall driver and freely received in an elongated aperture of each of the stall sleeve and the mandrel drive member is adapted to co-rotate the stall sleeve and the mandrel drive member when the stall driver is rotated by the drive tool. When full threaded engagement of the stall sleeve with the stall stop member occurs, a tubular body end of the stall sleeve contacts the radially extending flange of the stall driver to stall the drive tool.

According to still further embodiments, a prewinder apparatus attached to a drive tool for installation of a helical coil insert includes a body connected to the drive tool, and a mandrel axially extensible from the body and having a mandrel flange end including a slot. The mandrel is adapted to engage the helical coil insert to rotatably insert the coil insert. A drive member is releasably engaged to the mandrel and adapted to rotate the mandrel. A stall assembly includes: a stall stop member threadably engaged with the body; a stall sleeve slidably received in the stall stop member; a mandrel drive member having a drive end adapted to releasably engage with the slot to rotate the mandrel, the mandrel drive member slidably received in the stall sleeve; a stall driver slidably received within an inner diameter portion of mandrel drive member and having a radially extending flange; and a fastener frictionally engaged with the stall driver and freely received in an elongated aperture of each of the stall sleeve and the mandrel drive member adapted to co-rotate the stall sleeve and the mandrel drive member when the stall driver is rotated by the drive tool. When full threaded engagement of the stall sleeve with the stall stop member occurs a tubular body end of the stall sleeve contacts the radially extending flange of the stall driver to stall the drive tool.

According to other embodiments, a prewinder apparatus attached to a drive tool for installation of a helical coil insert includes a body connected to the drive tool. A prewinder portion is movable with respect to the body. A mandrel axially extensible from the prewinder portion is adapted to engage the helical coil insert to rotatably insert the coil insert. A drive system is adapted to rotate the mandrel and translate the mandrel in each of an installation direction and a retraction direction. A disengagement mechanism is adapted to disengage the mandrel from the drive system when the helical coil insert reaches an installed position by translation of the mandrel in the installation direction. A stall mechanism is adapted to stop rotation of the mandrel when the mandrel is retracted in the retraction direction to a fully retracted position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
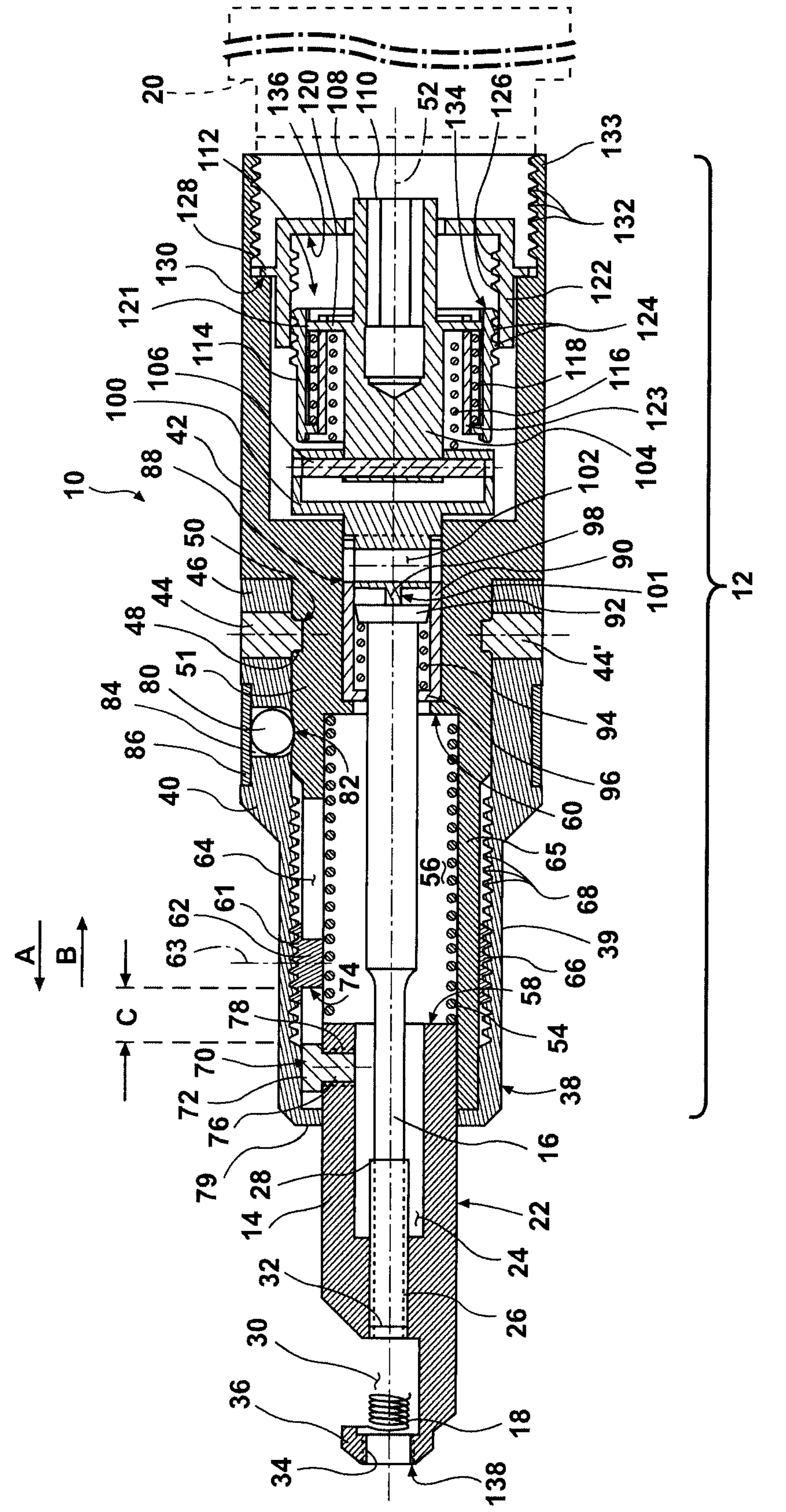
FIG. 1 is a cross sectional front elevational view of a retractable prewinder assembly of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath”, “below”, “lower”, “above”, “upper” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Referring to FIG. 1, a retractable prewinder apparatus 10 includes a disengagement mechanism or prewinder drive assembly 12 having a prewinder portion 14 releasably connected to the prewinder drive assembly 12. A mandrel 16 axially disposed in prewinder drive assembly 12 and extending through prewinder portion 14 is rotated by the prewinder drive assembly 12 to insert a helically coiled insert 18. Motive drive force to rotate portions of the prewinder drive assembly 12 including mandrel 16 can be provided using a tool 20 such as an electric motor powered for example by a battery or 110 volt AC power, a pneumatic drive such as air or hydraulic fluid, or similar drive device.

Figure 18:
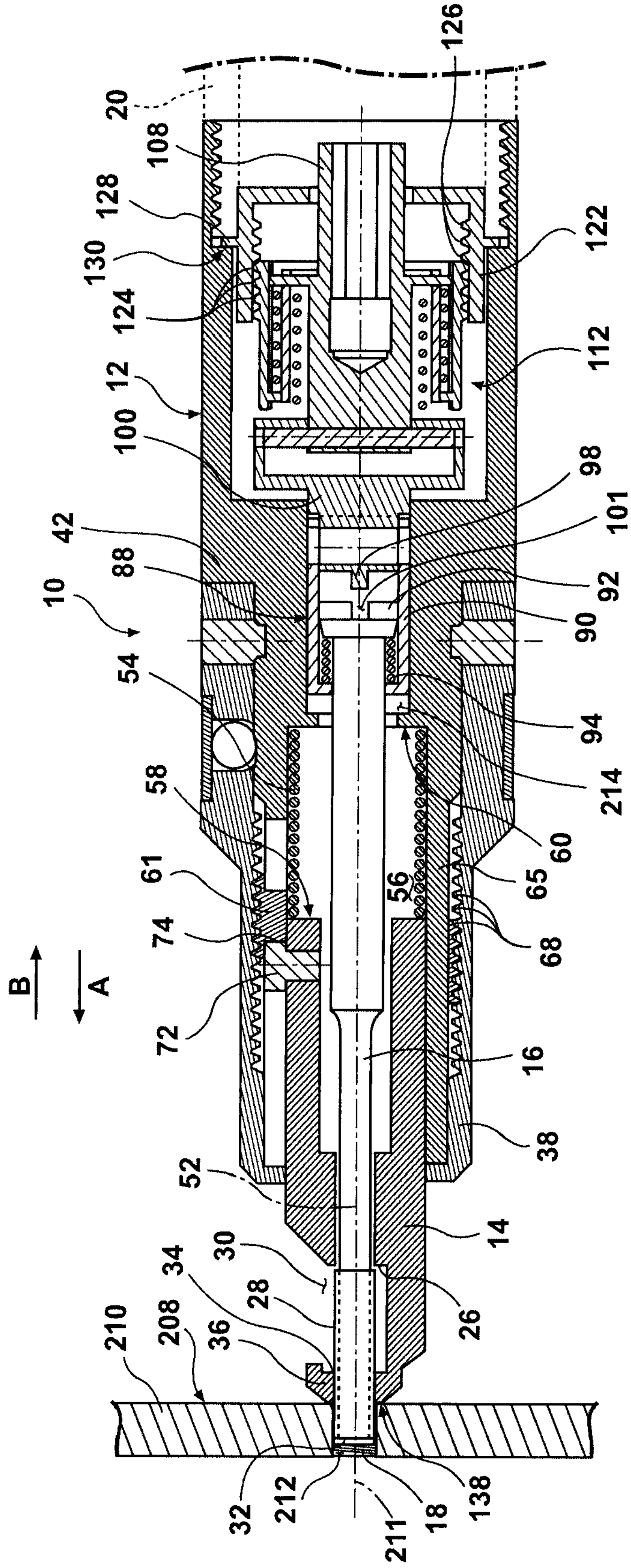
FIG. 18 is a cross sectional front elevational view of the retractable prewinder assembly of FIG. 1 modified to show displacement during an intermediate coil installation step.

Prewinder portion 14 includes a predominantly tubular shaped prewinder body 22 having a longitudinal cavity 24 coaxially aligned with a threaded longitudinal aperture 26. Threaded longitudinal aperture 26 is adapted to threadably receive a threaded body portion 28 of mandrel 16. The helically coiled insert 18 is positioned within an insert receiving cavity 30 prior to rotation of the mandrel 16. A coil engagement end 32 of mandrel 16 engages the helically coiled insert 18 to rotatably direct the helically coiled insert 18 into a coil diameter reducing aperture 34 created in a coil reducing member 36 which defines a free end of prewinder portion 14. Coil diameter reducing aperture 34 has a predefined aperture size to suit installation of the helically coiled insert 18 in one of a plurality of panel apertures which will be described in reference to FIG. 18.

Prewinder portion 14 is axially slidably received in an adapter 38 within a first adapter portion 39. First adapter portion 39 is homogeneously and integrally connected to a second adapter portion 40 with first adapter portion 39 having a smaller outside diameter than second adapter portion 40. Adapter 38 is in turn releasably connected to a body 42 using at least one and according to several embodiments a plurality of fasteners 44, 44'. Fasteners 44, 44' are threadably inserted through fastener receiving apertures created in second adapter portion 40 proximate to a body end wall 46. A shank 48 of each of the fasteners 44, 44' is received in a circumferential slot 50 created in an extending sleeve 51 of body 42. By loosening the fasteners 44, 44' with the shank 48 of each of the fasteners 44, 44' partially retained in the circumferential slot 50, the adapter 38 can be rotated with respect to body 42 while the shanks 48 slide within circumferential slot 50. Fasteners 44, 44' can then be tightened to engage their shanks 48 in contact with an end wall of circumferential slot 50 to frictionally engage second adapter portion 40 to body 42.

The components of retractable prewinder apparatus 10 are generally arranged with respect to a longitudinal axis 52 such that mandrel 16 is rotatable and axially translated coaxial with longitudinal axis 52. A first biasing member 54 is positioned within a cylinder portion 56 of body 42. According to several embodiments first biasing member 54 is a compression spring made for example of a spring steel material. An internal diameter defined by cylinder portion 56 is sized to slidably receive the outside diameter of prewinder body 22. First biasing member 54 allows axial sliding of prewinder portion 14 in each of a assembly installation direction “A” and a assembly contraction direction “B” oppositely directed from assembly installation direction “A”. First biasing member 54 biases prewinder portion 14 in assembly installation direction “A”.

First biasing member 54 is oriented to contact each of a prewinder end wall 58 of prewinder body 22 and a contact wall 60 defining an end wall of cylinder portion 56. A threaded insert 61 having an insert body 62 is translatable parallel to longitudinal axis 52 such that an insert longitudinal axis 63 oriented substantially transverse to longitudinal axis 52 can be positioned at the discretion of an operator of retractable prewinder apparatus 10. Insert body 62 is axially movable while being prevented from rotation within an adapter portion cavity 64. Adapter portion cavity 64 is created by removal of (or cast or molded without) a portion of the material of a tubular portion 65 of body 42. As previously noted, if fasteners 44, 44' are loosened with shanks 48 slidably received within circumferential slot 50, the insert longitudinal axis 63 of threaded insert 61 can be axially repositioned by rotating adapter 38 with respect to body 42. To translate threaded insert 61, threaded insert 61 includes a plurality of insert threads 66 which threadably engage a plurality of insert engagement threads 68 created on an internal diameter of first adapter portion 39. Because insert body 62 is non-rotatably retained within adapter portion cavity 64, manual rotation of adapter 38 axially displaces insert body 62 using insert threads 66 by threaded engagement with insert engagement threads 68 of first adapter portion 39.

Threaded insert 61 is used as a stop member which is axially and selectively positioned to control a dept of insertion of helically coiled insert 18. A stop fastener 70 includes a fastener head 72 which contacts an insert face 74 of threaded insert 61 to stop axial displacement of prewinder portion 14. An operator selectable distance between fastener head 72 and insert face 74 with the prewinder portion 14 in the fully extended position shown in FIG. 1 defines a prewinder depth of insertion "C". Prewinder depth of insertion "C" is controlled by displacing the insert longitudinal axis 63 of threaded insert 61 by rotation of adapter 38 as described above. Stop fastener 70 further includes an insert shank 76 which is threadably received in a threaded bore 78 created in prewinder body 22. Contact between fastener head 72 of stop fastener 70 also provides an extension stop defining the fully extended position of prewinder portion 14 in the assembly installation direction "A" by contact between fastener head 72 and an end wall 79 of first adapter portion 39. Fastener head 72 is sized to be slidably received within adapter portion cavity 64.

A ball 80 made for example from a metal or polymeric material is biased into engagement with one of a plurality of detent cavities 82 circumferentially created about extending sleeve 51 of body 42. Ball 80 is received in a ball cavity 84 created in second adapter portion 40. A biasing ring 86 made for example of a spring steel material is positioned in a circumferential slot created in second adapter portion 40 and allows ball 80 to deflect outwardly with respect to extending sleeve 51 in-between the various positions of the detent cavities 82. The detent cavities 82 are located at predetermined positions about the circumference of extending sleeve 51. According to several embodiments, movement of ball 80 to successive ones of detent cavities 82 corresponds with a predetermined increment such as 0.01 in (0.25 mm) of axial displacement for threaded insert 61. Once threaded insert 61 is positioned as desired by rotation of adapter 38 until ball 80 is received in one of the detent cavities 82, the fasteners 44, 44' are fully engaged such that the shanks 48 of the fasteners 44, 44' frictionally contact the circumferential slot 50 to temporarily and releasably fix the position of adapter 38 with respect to body 42. Once fixed, prewinder depth of insertion "C" is retained and repeatable for installation of multiple helically coiled inserts 18.

Prewinder drive assembly 12 further includes a disengagement mechanism such as a first clutch assembly 88. First clutch assembly 88 includes a clutch tube 90 slidably received in body 42. A mandrel flange end 92 is slidably received within an inner bore of clutch tube 90 such that mandrel flange end 92 with mandrel 16 is coaxially aligned with longitudinal axis 52. A second biasing member 94 is positioned within the bore of clutch tube 90 and contacts at opposite ends the mandrel flange end 92 and a clutch tube end wall 96 of clutch tube 90. Axial displacement of mandrel 16 and mandrel flange end 92 is therefore provided within the bore of clutch tube 90. A drive end 98 similar in shape to the slotted end of a slotted screwdriver extends from a drive member 100. Drive end 98 is received within a slot 101 created in mandrel flange end 92 such that rotation of drive member 100 operates to co-rotate mandrel 16. Drive member 100 is releasably coupled to clutch tube 90 using a fastener such as a first pin 102 slidably received through opposed apertures of clutch tube 90 and a corresponding aperture of drive member 100.

Drive member 100 is similarly coupled to a drive coupling 104 using a fastener such as a second pin 106. Drive coupling 104 provides a drive socket 108 which slidably receives a male extending drive member (not shown) extending from tool 20. A socket mating connection 110 is created in drive socket 108 which is geometrically-shaped to correspond to the geometric shape of the drive member extending from tool 20. Common shapes used for this purpose include heptagon or hexagon shaped drive members.

Figure 13:
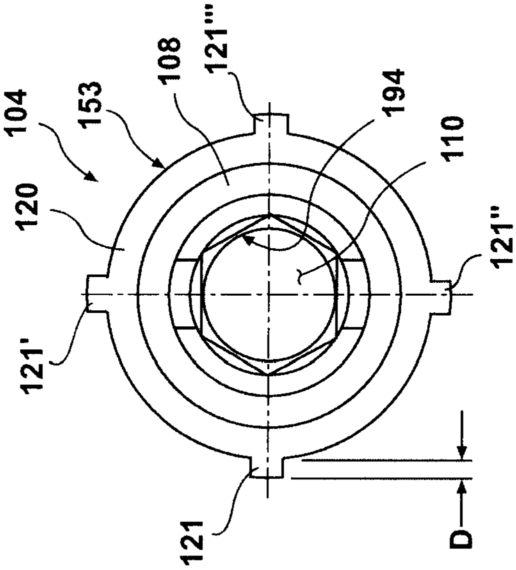
FIG. 13 is an end elevational view of the drive coupling of FIG. 12 viewed from right to left in FIG. 12.
Figure 15:
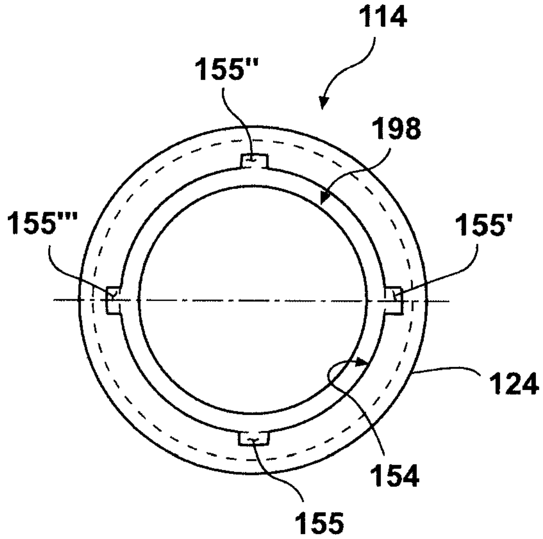
FIG. 15 is an end elevational view of the stall coupling of FIG. 14 viewed from left to right in FIG. 14.

Prewinder drive assembly 12 further includes a stall mechanism such as a second clutch assembly 112. Second clutch assembly 112 includes a stall coupling 114 which has each of a third biasing member 116 and a fourth biasing member 118 positioned within the stall coupling 114. An engagement flange 120 radially extending outwardly from drive socket 108 defines a contact wall for each of the third and fourth biasing members 116, 118. A plurality of extending keys 121 integrally extend from an outer perimeter of engagement flange 120. The function of the extending keys 121 will be described in reference to FIGS. 3, 13, and 15.

Stall coupling 114 is both slidably and threadably receivable within an inner bore of a stall sleeve 122. A tubular insert 123 can also be provided within stall coupling 114 to maintain separation between the third and fourth biasing members 116, 118. Stall coupling 114 can include a plurality of left hand outer perimeter threads 124 which are threadably engaged with a plurality of left hand inner cavity threads 126 provided with stall sleeve 122. A perimeter radial flange 128 radially extending outwardly from stall sleeve 122 abuts against a contact face 130 of body 42 to fix the position of stall sleeve 122 within body 42. A plurality of inner body threads 132 are created proximate to a body/tool engagement end 133 of body 42. Inner body threads 132 are adapted to threadably receive corresponding threads of tool 20 to threadingly engage tool 20 to body 42, having perimeter radial flange 128 of stall sleeve 122 contacting both contact face 130 and a threaded insertion end of tool 20.

Second clutch assembly 112, and in particular stall coupling 114, are slidably received within the inner cavity of stall sleeve 122 until outer perimeter threads 124 threadably engage inner cavity threads 126. Thereafter, further rotation of drive socket 108 pulls drive socket 108 in the assembly contraction direction "B" until an end face 134 of stall coupling 114 contacts an interior wall face 136 of stall sleeve 122 preventing further translation of stall coupling 114 and thereby frictionally stalling further rotation of tool 20.

Figure 19:
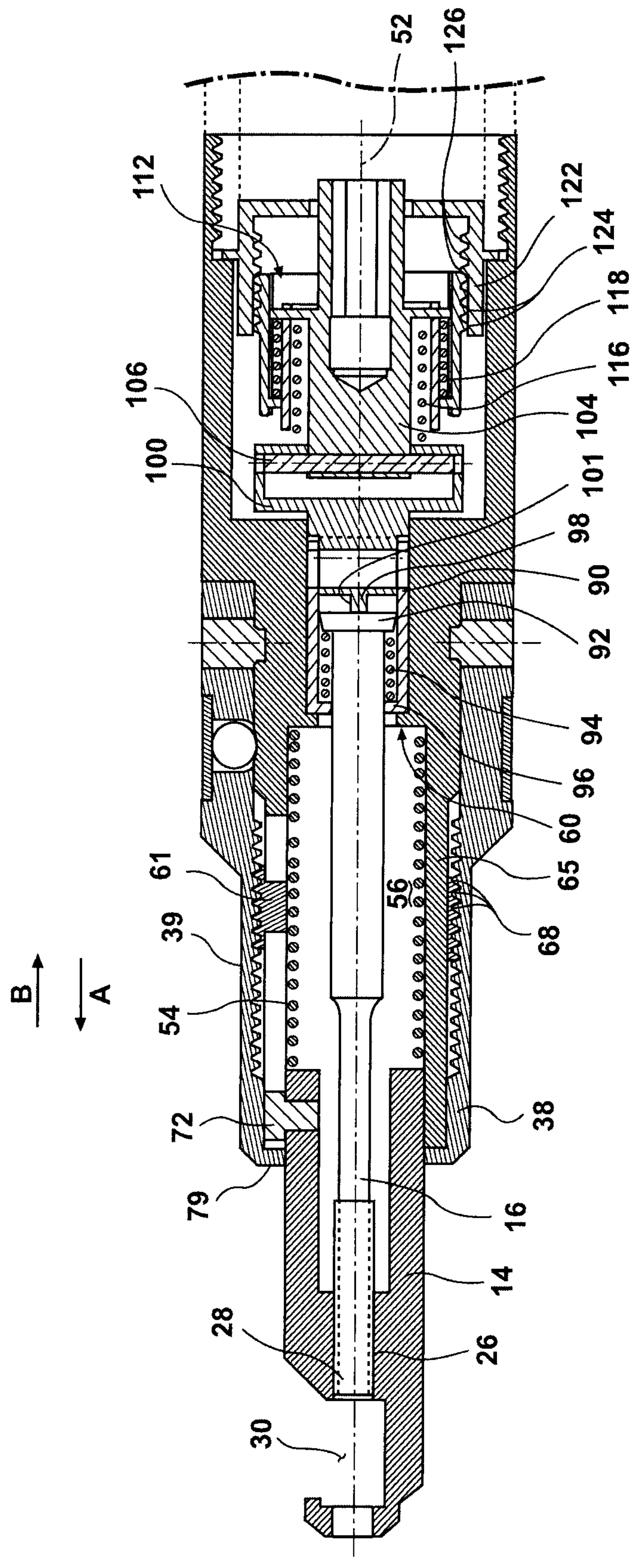
FIG. 19 is the cross sectional front elevational view of the retractable prewinder assembly of FIG. 18 further modified to show prewinder portion displacement following completion of coil installation.

Installation of helically coiled insert 18 is accomplished by translating both tool 20 with the components of retractable prewinder apparatus 10 coaxially along longitudinal axis 52 in the assembly installation direction "A" until contact occurs between coil reducing member 36 at a prewinder contact end 138 with a panel. Further translation of retractable prewinder apparatus 10 in the assembly installation direction “A” together with operation of tool 20 causes prewinder portion 14 to move inwardly in the assembly contraction direction “B” which will be described in greater detail in reference to FIGS. 18 and 19.

Figures 2, 3:
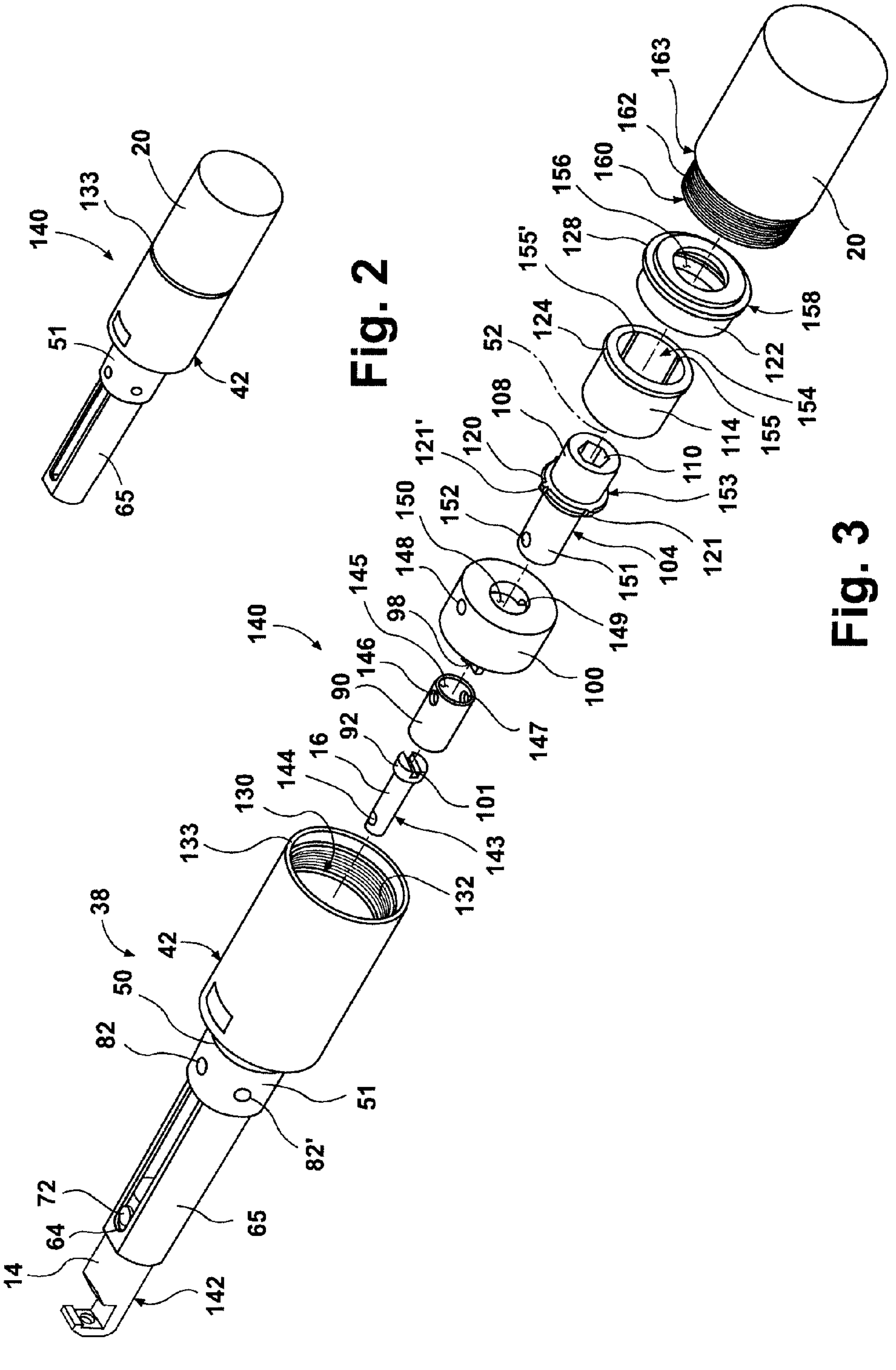
FIG. 2 is a front elevational perspective view of a tool and driving sleeve of the present disclosure.
FIG. 3 is a front elevational assembly view of the tool/prewinder assembly of FIG. 2.

Referring to FIG. 2, a tool and driving sleeve assembly 140 includes tool 20 threadably coupled to body/tool engagement end 133 of body 42. Tubular portion 65 and extending sleeve 51 extend oppositely with respect to tool 20.

Referring to FIG. 3, the components of tool and driving sleeve assembly 140 are shown prior to assembly. The adapter portion cavity 64 of tubular portion 65 extends through a wall thickness of tubular portion 65. Fastener head 72 is slidably received within adapter portion cavity 64. Adapter 38 is not shown for clarity. A prewinder fully extended position 142 of prewinder portion 14 is shown. Individual ones of the detent cavities 82, 82' positioned about extending sleeve 51 can be located closer or further away from each other depending on a total quantity of detent cavities 82 selected. Mandrel 16 can further be divided into sections, for example having a body tube 143 connected to mandrel flange end 92 and a second portion (not shown) which extends through prewinder portion 14.

A pin aperture 144 can be provided at a free end of body tube 143 to pin the second portion of mandrel 16 for extension through prewinder portion 14. Mandrel 16 and mandrel flange end 92 are slidably disposed within a clutch tube through bore 145 of clutch tube 90. Clutch tube 90 can further include oppositely positioned first and second clutch tube pin bores 146, 147 adapted to receive a pin for connecting clutch tube 90 to drive member 100. Drive member 100 can further include a first drive member pin bore 148 which is coaxially aligned with opposed internally located first and second semi-circular pin bores 149, 149' (only first semi-circular pin bore 149 is clearly visible). The drive end 98 of drive member 100 can engage with the slot 101 of mandrel 16 to rotate mandrel 16, or, drive end 98 can disengage from slot 101 as the mandrel threadably extends from prewinder portion 14 when helically coiled insert 18 reaches its predetermined set or installation depth, disengaging drive end 98 from slot 101.

Drive member 100 can further include a drive member bore 150 which is adapted to slidably receive a first drive coupling portion 151 of drive coupling 104. With first drive coupling portion 151 inserted through drive member bore 150, a pin is slidably insertable through first drive member pin bore 148 and each of first and second semi-circular pin bores 149, 149', as well as through a drive coupling pin bore 152 created through first drive coupling portion 151. With the pin thus inserted, the first and second semi-circular pin bores 149, 149' of drive member 100 allow a degree of freedom of displacement for the pin relative to the first and second semi-circular pin bores 149, 149' to permit drive coupling 104 to disengage from drive member 100 under certain operating conditions. Drive coupling 104 further includes a perimeter surface 153 of engagement flange 120. The plurality of extending keys 121 extend radially outward with respect to perimeter surface 153.

Stall coupling 114 includes an inner bore surface 154 into which is machined or formed a plurality of longitudinal slots 155, 155' which are oriented parallel to longitudinal axis 52. Individual ones of the plurality of extending keys 121 are received in the longitudinal slots 155. Longitudinal slots 155 allow axial sliding motion of drive coupling 104 with respect to stall coupling 114 while insertion of the extending keys 121 into the longitudinal slots 155 translates the rotational motion of drive coupling 104 to stall coupling 114. The outer perimeter threads 124 of stall coupling 114 are initially slidably received within a stall sleeve bore 156 of stall sleeve 122. When the drive socket 108 of drive coupling 104 is received in stall sleeve bore 156, the drive member (not shown) of tool 20 is slidably received in socket mating connection 110 of drive coupling 104, permitting the rotational drive torque of tool 20 to be transferred to drive coupling 104.

The assembly of tool and driving sleeve assembly 140 is completed when the perimeter radial flange 128 of stall sleeve 122 abuts contact face 130. A flange perimeter surface 158 of perimeter radial flange 128 freely slides into body 42 having clearance with respect to inner body threads 132. A tool end 160 of tool 20 contacts an opposite face of perimeter radial flange 128 when a plurality of tool threads 162 are threadably engaged with inner body threads 132 until the tool contact end 163 of tool 20 contacts body/tool engagement end 133 of body 42.

Figure 4:
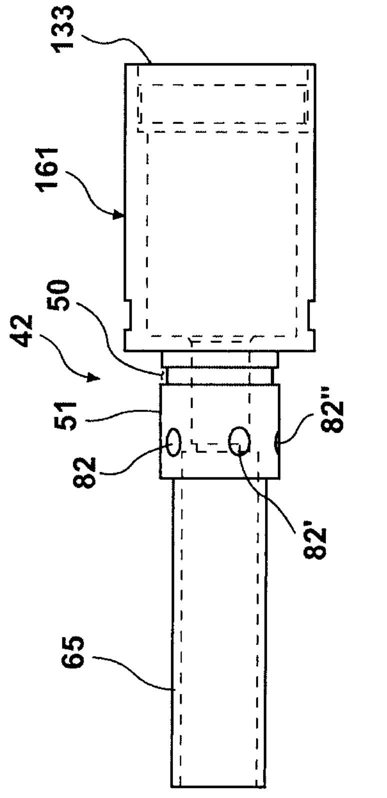
FIG. 4 is a bottom plan view of an adapter from the assembly of FIG. 3.

Referring to FIG. 4 and again to FIG. 1, body 42 includes tubular portion 65 extending oppositely with respect to body/tool engagement end 133. Tubular portion 65 is created as a hollow tube-shaped extension of body 42 having a diameter smaller than a diameter of extending sleeve 51 which is integrally and homogeneously connected to body 42. The plurality of detent cavities 82, 82', 82" which are shown in this view are positioned at common intervals about the perimeter of extending sleeve 51. The quantity of detent cavities 82 can be varied and according to several embodiments each successive detent cavity 82 represents a linear displacement of the threaded insert 61 of approximately 0.010 in (0.25 cm) as ball 80 is partially received in successive ones of the detent cavities 82. The circumferential slot 50 is created by forming or machining material of extending sleeve 51. A main body portion 161 is also tubular in shape and provides body/tool engagement end 133. Main body portion 161 can have a diameter larger than a diameter of both tubular portion 65 and extending sleeve 51.

Figure 5:
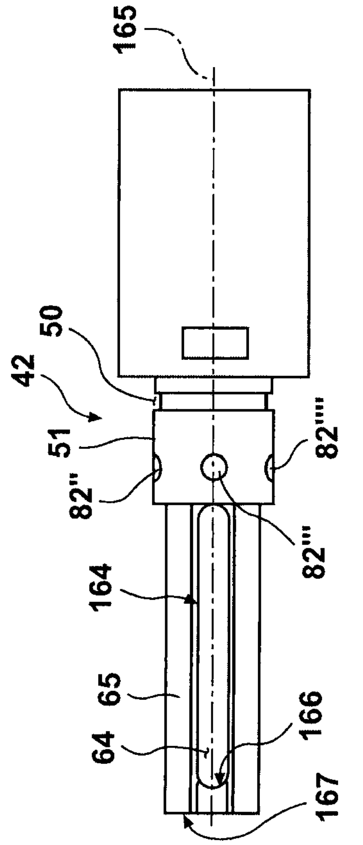
FIG. 5 is a top plan view of the adapter of FIG. 4.

Referring to FIG. 5, a flat 164 is machined or formed parallel to a longitudinal axis 165 of tubular portion 65. Removal of material or formation of flat 164 creates the elongated adapter portion cavity 64. A cavity end wall 166 is created to provide a positive stop end for adapter portion cavity 64 to retain the structural integrity of tubular portion 65. Cavity end wall 166 is positioned proximate to an end face 167 of tubular portion 65.

Figure 6:
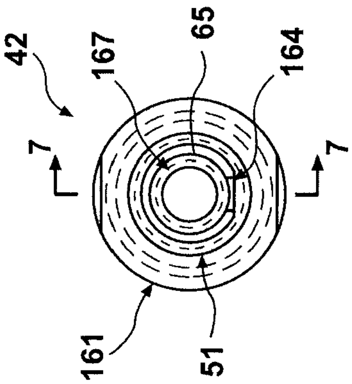
FIG. 6 is an end elevational view of the adapter of FIG. 4 viewed from left to right in FIG. 4.

Referring to FIG. 6, the diameter relationships of tubular portion 65, the increased diameter extending sleeve 51, and the largest diameter of main body portion 161 are evident. The flat 164 can be positioned at any perimeter portion of tubular portion 65 at the discretion of the manufacturer.

Referring FIG. 7 and again to FIG. 1, contact wall 60 creates a division between cylinder portion 56 of tubular portion 65 and a clutch tube receiving bore 168 created in extending sleeve 51. Clutch tube receiving bore 168 opens into a clutch assembly receiving bore 170 created in main body portion 161 adapted to receive second clutch assembly 112.

Figure 8:
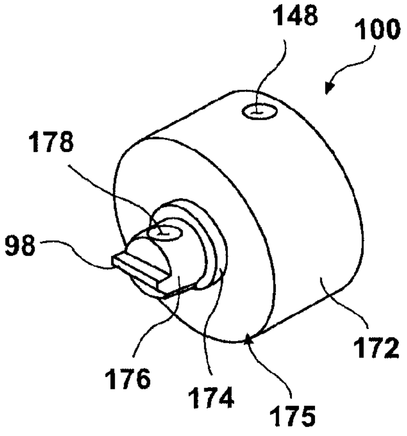
FIG. 8 is a front left perspective view of a drive member from the assembly of FIG. 3.

Referring to FIG. 8, drive member 100 includes a cylindrical body 172 having first drive member pin bore 148 created transversely thereto. A raised shoulder 174 extends from an end wall 175. A drive end shaft 176 having a diameter smaller than a diameter of raised shoulder 174 extends integrally and homogeneously from end wall 175. A drive end shaft through-bore 178 is oriented substantially parallel to first drive member pin bore 148 and is oriented transverse to a longitudinal axis of drive member 100. Drive end 98 is created at a free end of drive end shaft 176. According to several embodiments drive member 100 can be made from a metal including steel or stainless steel or a polymeric material.

Figure 7:
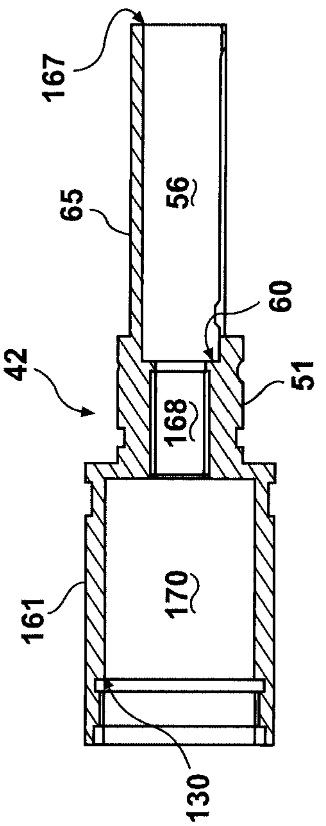
FIG. 7 is a cross sectional front elevational view taken at section 7 of FIG. 6.

Referring to FIG. 9 and again to FIGS. 1, 3, and 7, a concave circumferential recess 180 can be created about the perimeter of drive end shaft 176. Concave circumferential recess 180 can assist pin alignment during installation of first pin 102. A shoulder end face 182 of raised shoulder 174 provides a contact face for clutch tube 90 when clutch tube 90 is fully inserted into clutch tube receiving bore 168 of body 42. First and second semi-circular pin bores 149, 149' are co-axially aligned with first drive member pin bore 148.

Figure 10:
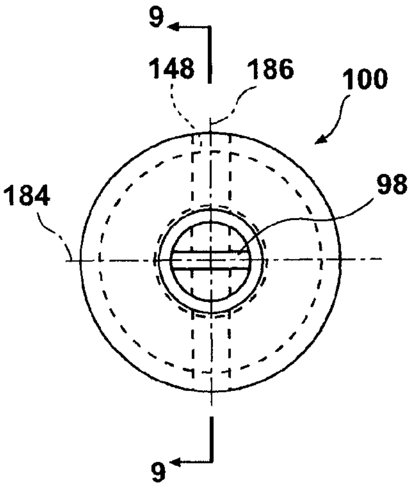
FIG. 10 is an end elevational view of the drive member of FIG. 8.

Referring to FIG. 10, a drive end axis 184 is centrally disposed through drive end 98. A pin bore longitudinal axis 186 of first drive member pin bore 148 is oriented substantially transverse to drive end axis 184.

Figure 11:
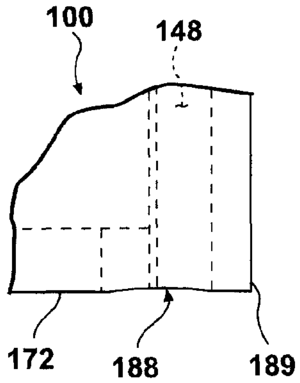
FIG. 11 is a front elevational view of Area 11 of FIG. 9.

Referring to FIG. 11 and again to FIG. 1, a cylindrical body circumferential concave recess 188 can be created proximate to a free end 189 of cylindrical body 172. Circumferential concave recess 188 can be provided to assist with the alignment during installation of first pin 102 during installation into first drive member pin bore 148.

Figure 12:
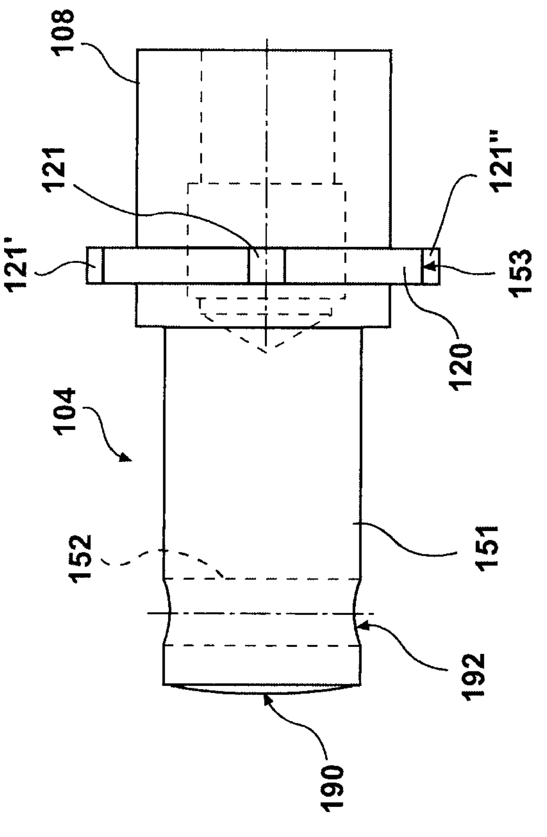
FIG. 12 is a front elevational view of a drive coupling from the assembly of FIG. 3.

Referring to FIG. 12 and again to FIG. 1, drive coupling 104 can be made of a metal material such as steel or stainless steel or a polymeric material and can include a coupling portion end face 190 which can have a semi-circular shape. A concave circumferential slot 192 can be formed about the perimeter of first drive coupling portion 151 which also has the function of assisting with the alignment during installation of second pin 106 when installed in the drive coupling pin bore 152. Each of the extending keys 121 including exemplary extending keys 121, 121', 121" extend radially outwardly from the perimeter surface 153 of engagement flange 120.

Referring to FIG. 13 and again to FIG. 1, each of four extending keys 121, 121', 121", 121''' extend at a key height "D" from the perimeter surface 153 so that each of the extending keys 121 have a common geometry. A geometric-shaped bore 194 is created to form the socket mating connection 110 of drive socket 108. According to several embodiments geometric-shaped bore 194 can have multiple faceted sides defining for example a heptagon or an octagon. These multiple sides are adapted to receive the tool engagement member (not shown) of tool 20.

Figure 14:
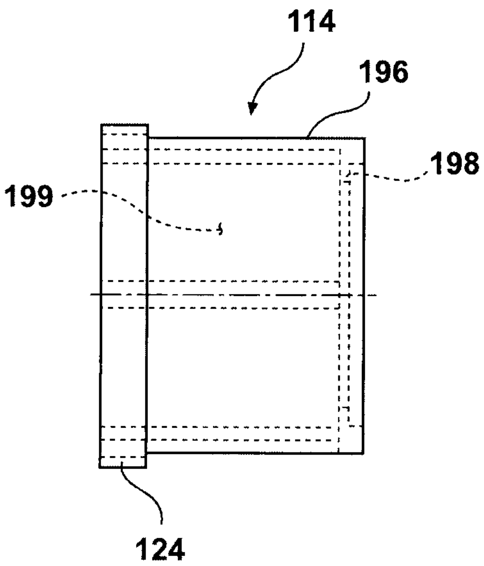
FIG. 14 is a front elevational view of a stall coupling from the assembly of FIG. 3.

Referring to FIG. 14, stall coupling 114 can be made from a metal material such as steel or stainless steel or a polymeric material. Stall coupling 114 includes a stall coupling tubular body 196 having integrally and homogeneously connected outer perimeter threads 124 (shown in block form). Outer perimeter threads 124 extend radially outwardly and above a surface level defined by stall coupling tubular body 196. A coupling end wall 198 is provided at one end of a coupling cavity 199 created in stall coupling tubular body 196 oppositely positioned with respect to outer perimeter threads 124.

Referring to FIG. 15 and again to FIG. 3, according to several embodiments each successive one of the longitudinal slots 155, 155' 155", 155''' is oriented at a 90 degree increment with respect to proximate ones of the longitudinal slots 155. Each of the four longitudinal slots 155 are adapted to slidably receive one of the extending keys 121 of drive coupling 104. Engagement of the extending keys 121 into each of the longitudinal slots 155 therefore allows the drive coupling 104 to be slidably received within stall coupling 114 while transferring a rotational force of drive coupling 104 to stall coupling 114. The coupling end wall 198 provides a positive stop point for contact between engagement flange 120 of drive coupling 104 and stall coupling 114. The inner bore surface 154 of stall coupling 114 is adapted to slidably receive the perimeter surface 153 of engagement flange 120 of drive coupling 104.

Figure 16:
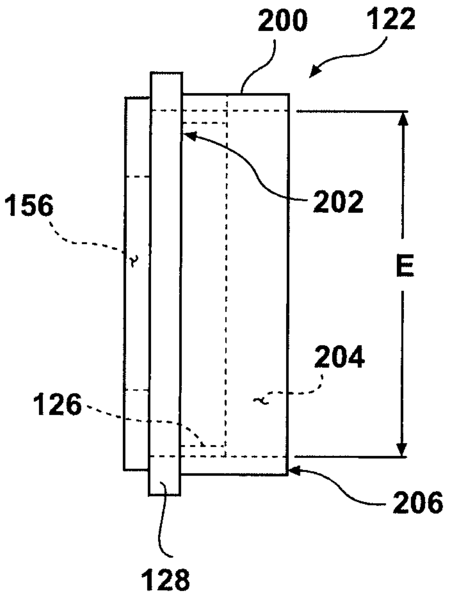
FIG. 16 is a front elevational view of a stall sleeve from the assembly of FIG. 3.

Referring to FIG. 16 and again to FIG. 1, stall sleeve 122 can be created from a metal material such as steel or stainless steel or a polymeric material. Stall sleeve 122 includes a sleeve body 200 having a tubular shape. A cavity end wall 202 is created at one end of a sleeve cavity 204. Cavity end wall 202 provides a positive stop point for stall coupling 114 when threadably received in stall sleeve 122. As previously noted perimeter radial flange 128 extends radially outwardly with respect to sleeve body 200 to provide for positive engagement and positioning of stall sleeve 122.

Figure 17:
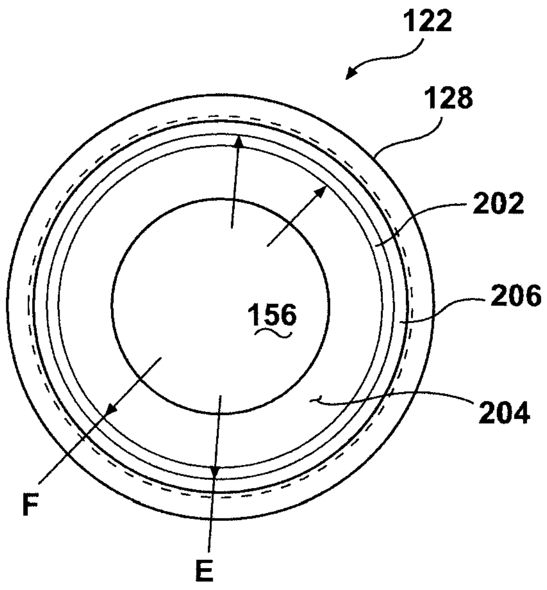
FIG. 17 is an end elevational view of the stall sleeve of FIG. 16 viewed from right to left in FIG. 16.

Referring to FIG. 17 and again to FIGS. 1 and 3, stall sleeve 122 includes stall sleeve bore 156 which freely receives drive socket 108. Sleeve cavity 204 has a cavity diameter "E" which is larger than a diameter "F" defined by the plurality of the threads of inner cavity threads 126.

Figure 20:
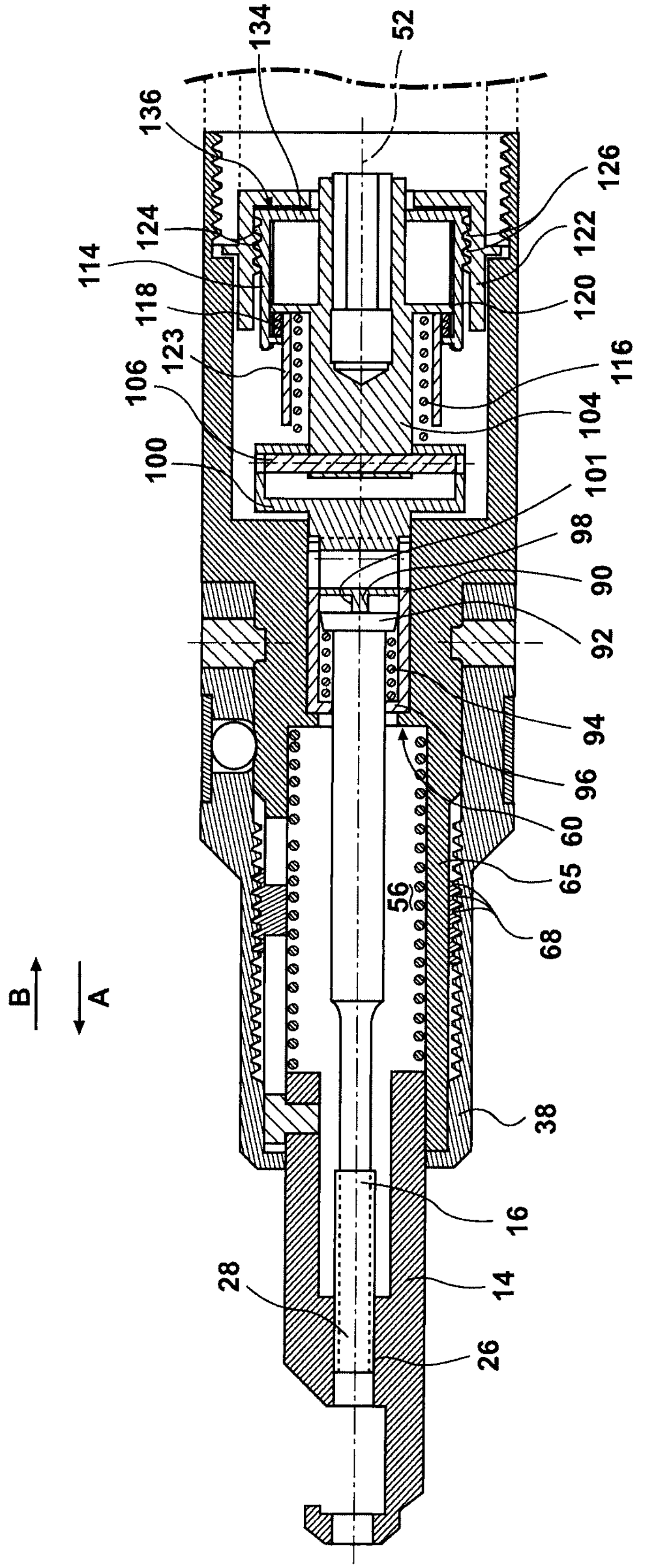
FIG. 20 is the cross sectional front elevational view of the retractable prewinder assembly of FIG. 19 further modified to show second clutch operation in a stall condition.

Referring to FIGS. 18-20 and again to FIG. 1, operation of retractable prewinder apparatus 10 is as follows. As shown in FIG. 1, an initial position of retractable prewinder apparatus 10 provides prewinder portion 14 at a fully extended position biased by first biasing member 54 in the assembly installation direction "A". The threaded body portion 28 of mandrel 16 is fully retracted into the threaded longitudinal aperture 26 which provides clearance for insertion of a helically coiled insert 18 into the insert receiving cavity 30. Drive end 98 of drive member 100 is fully seated in the slot 101 of mandrel flange end 92. Threaded insert 61 is positioned at prewinder depth of insertion "C" based at least on a size of helically coiled insert 18 and the desired depth of insertion for helically coiled insert 18. Second clutch assembly 112 is in a non-engaged position with third and fourth biasing members 116, 118 in their fully extended positions and having outer perimeter threads 124 of stall coupling 114 disengaged from the plurality of inner cavity threads 126 of stall sleeve 122.

Referring more specifically to FIG. 18 and again to FIG. 1, retractable prewinder apparatus 10 is shown following operation to fully seat helically coiled insert 18. To accomplish this, prewinder contact end 138 of coil reducing member 36 is brought into contact with a first panel side 208 of a panel 210. The longitudinal axis 52 of retractable prewinder apparatus 10 is coaxially aligned with an aperture axis 211 of an insert receiving aperture 212 formed in panel 210. Tool 20 is operated to co-rotate drive socket 108, drive member 100, clutch tube 90, and mandrel 16 in a first direction of rotation such as a clockwise direction of rotation. Rotation of mandrel 16 causes the threaded body portion 28 of mandrel 16 to threadably engage threaded longitudinal aperture 26 of prewinder portion 14 which pulls prewinder portion 14 in the assembly contraction direction "B" into cylinder portion 56, compressing the first biasing member 54. Coil engagement end 32 of mandrel 16 engages the helically coiled insert 18 to drive helically coiled insert 18 through coil diameter reducing aperture 34 of coil reducing member 36 which reduces the outside diameter of helically coiled insert 18 to suit the diameter of insert receiving aperture 212 of panel 210. Prewinder portion 14 is continuously withdrawn into cylinder portion 56 until fastener head 72 contacts insert face 74 of threaded insert 61.

When helically coiled insert 18 reaches its predetermined depth of insertion "C", the threaded body portion 28 of mandrel 16 is disengaged from the threaded longitudinal aperture 26. Also at this time, due to the axial translation of mandrel 16 in the assembly installation direction "A", mandrel flange end 92 compresses the second biasing member 94, disengaging the drive end 98 of drive member 100 from the slot 101 of mandrel flange end 92. From the position shown in FIG. 18 having the helically coiled insert 18 fully inserted into panel 210, and drive end 98 rotatably released with respect to slot 101, when the operator thereafter releases the trigger or switch (not shown) of tool 20, tool 20 automatically reverses rotating direction to an opposite or second direction of rotation such as in a counterclockwise direction of rotation to begin extension of mandrel 16 from the fully retracted position shown. At this time, a clutch tube clearance cavity 214 between clutch tube 90 and contact wall 60 may be present. Outer perimeter threads 124 are not engaged with inner cavity threads 126 at this time.

Referring more specifically to FIG. 19 and again to FIG. 1, when reverse operation of tool 20 occurs, the biasing force of second biasing member 94 biases mandrel flange end 92 in the assembly contraction direction "B" to re-attain engagement of drive end 98 into slot 101. At the same time, motion of mandrel 16 in the assembly contraction direction "B" reengages the threaded body portion 28 of mandrel 16 with the threaded longitudinal aperture 26 of prewinder portion 14. Thereafter, continued rotation in a counter-clockwise direction of mandrel 16 by threaded engagement between threaded body portion 28 and threaded longitudinal aperture 26, in addition to the biasing force of first biasing member 54 translates prewinder portion 14 in the assembly installation direction "A" to the fully extended position, occurring when fastener head 72 contacts the end wall 79 of first adapter portion 39. Once the biasing force of second biasing member 94 acting against clutch tube end wall 96 and mandrel flange end 92 initiates engagement between drive end 98 and slot 101, engagement between drive end 98 and slot 101 is maintained by the driving force created by rotation of mandrel 16 and the threaded engagement of threaded body portion 28 within threaded longitudinal aperture 26. At this point, second clutch assembly 112 remains in its non-engaged position having third and fourth biasing members 116, 118 in their fully extended positions and outer perimeter threads 124 disengaged from inner cavity threads 126.

Referring more specifically to FIG. 20 and again to FIG. 1, when the fully extended position of prewinder portion 14 is reached, the momentum of the rapidly rotating mandrel 16 causes mandrel 16 to continue its motion in the assembly contraction direction "B" until the outer perimeter threads 124 of stall coupling 114 threadably engage with the inner cavity threads 126 of stall sleeve 122. Continued rotation of mandrel 16 co-rotates stall coupling 114, translating stall coupling 114 in the assembly contraction direction "B". Translation of stall coupling 114 continues until end face 134 of stall coupling 114 contacts the interior wall face 136 of stall sleeve 122, preventing further translation of stall coupling 114 and thereby preventing further translation of mandrel 16 which frictionally stalls tool 20. As stall coupling 114 translates by engagement between the outer perimeter threads 124 and inner cavity threads 126, fourth biasing member 118 of second clutch assembly 112 is compressed by contact with engagement flange 120 of drive coupling 104 which is substantially retained in its axial position. Initial compression of third biasing member 116 also begins to occur during this event by contact between engagement flange 120 and drive member 100.

Figure 9:
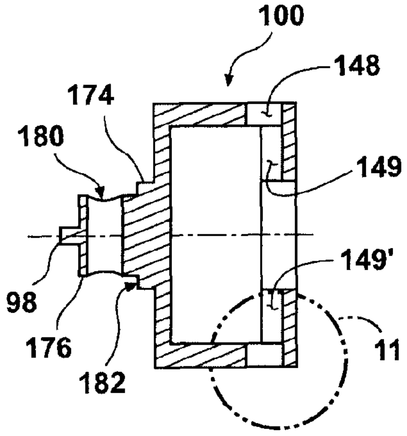
FIG. 9 is a cross sectional front elevational view taken at section 9 of FIG. 10.
Figure 21:
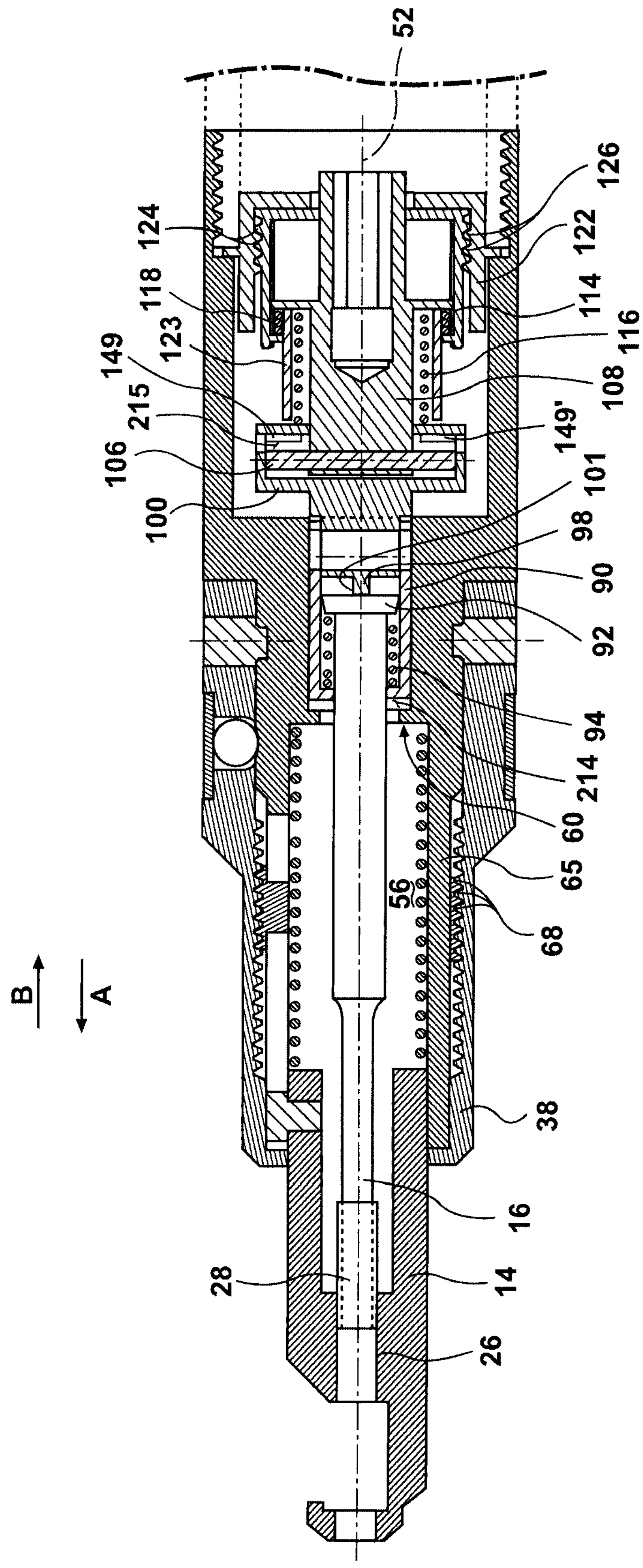
FIG. 21 is the cross sectional front elevational view of the retractable prewinder assembly of FIG. 20 further modified to show disengagement of the drive member from the drive socket disengaging rotational drive to the mandrel.

Referring to FIG. 21 and again to FIGS. 1 and 9, additional final momentum of mandrel 16 once the stalled position is reached causes axial displacement of drive member 100 in the assembly contraction direction "B" against the biasing force of third biasing member 116. This axial translation of drive member 100 causes the second pin 106 to disengage from the first and second hemispherical-shaped bores 149, 149' of drive member 100 such that second pin 106 is freely disposed within a drive member cavity 215 of drive member 100. Disengagement of second pin 106 from drive member 100 disengages drive socket 108 from drive member 100. Further rotation of drive socket 108 by tool 20 induces no further retraction of mandrel 16 in the assembly contraction direction "B". The fully retracted position of mandrel 16 shown in FIG. 21 can be returned to the initial operating position shown in FIG. 1 when rotation of tool 20 is stopped and the third and fourth biasing members 116, 118 force drive member 100 to axially translate with respect to longitudinal axis 52 in the assembly installation direction "A" until second pin 106 reengages with drive member 100. At this point, initial rotation of tool 20 in the insertion direction immediately causes co-rotation of stall coupling 114 which disengages outer perimeter threads 124 from inner cavity threads 126 to return second clutch assembly 112 and mandrel 16 to the position shown in FIG. 1.

Figure 23:
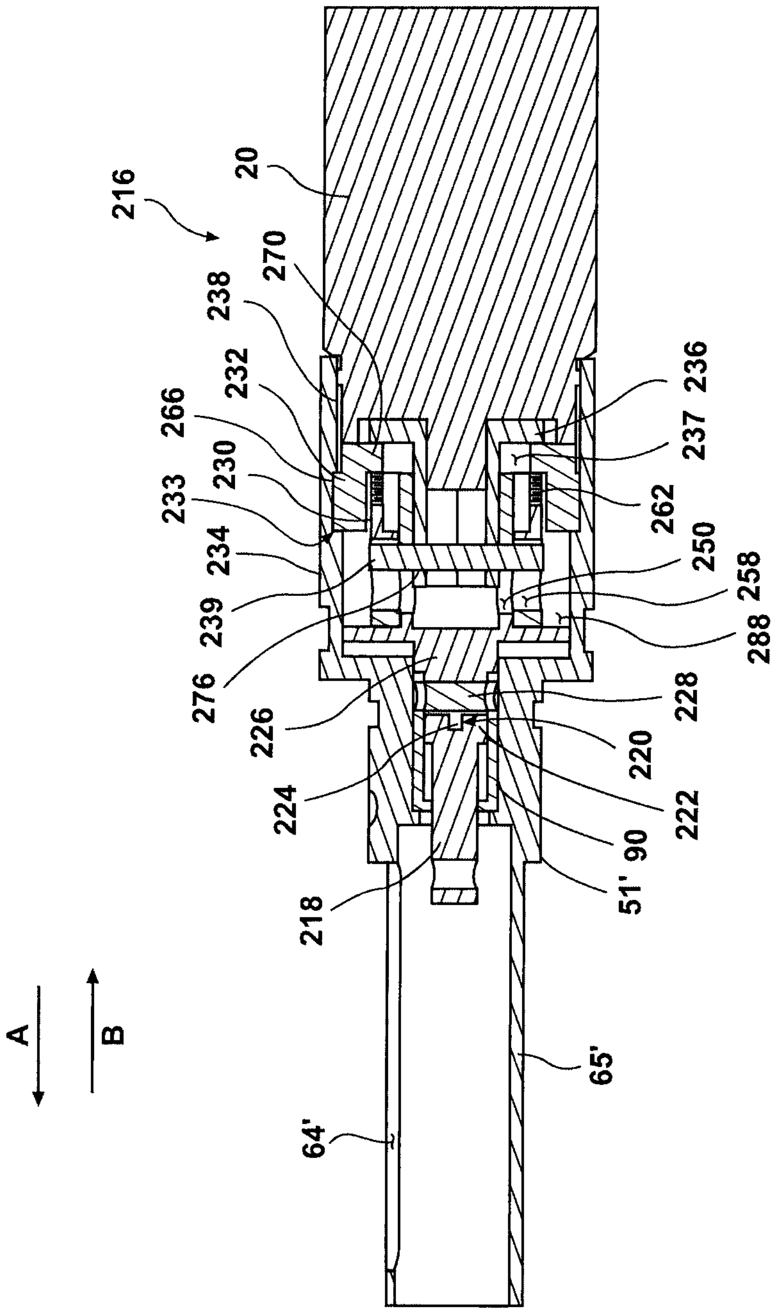
FIG. 23 is a cross sectional front elevational view taken at section 23 of FIG. 22.
Figure 22:
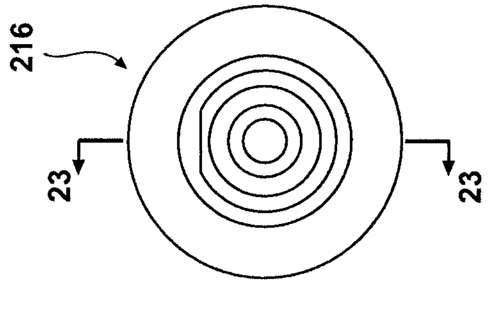
FIG. 22 is an end elevational view of a prewinder drive assembly of another embodiment of the present disclosure adapted for stall operation.

Referring to FIGS. 22 and 23, a disengagement mechanism or prewinder drive assembly 216 of an additional embodiment of the present disclosure is modified from the prewinder drive assembly 12 to replace second clutch assembly 112 with a stall mechanism such as a stall assembly. Prewinder drive assembly 216 can include a modified mandrel portion 218 having a first one of a two piece mandrel assembly shown. Use of a two piece mandrel assembly allows increased flexibility to increase or decrease the total length of the mandrel using the fixed length of the mandrel portion 218 and varying the length of an extending portion (not shown). A slot 220 similar to slot 101 is created in a mandrel flange end 222 which is adapted to receive and be rotatably engaged by a drive end 224 of a mandrel drive member 226. Mandrel drive member 226 is connected using a fastener such as a first pin 228 to clutch tube 90 commonly used with prewinder drive assembly 216 and prewinder drive assembly 12.

The stall assembly includes mandrel drive member 226 slidably received within a stall sleeve 230. Stall sleeve 230 is in turn received within a stall stop member 232. Stall stop member 232 is directly threadably received until reaching a shoulder stop 233 within a body 234. Body 234 is modified from body 42 to provide an extended length thread portion 238 adapted to receive a threaded portion of stall stop member 232 and the threaded portion of tool 20. A stall driver 236 is slidably received within an inner diameter portion of mandrel drive member 226. A fastener such as a second pin 239 connects each of mandrel drive member 226, stall sleeve 230, and stall driver 236.

Prewinder drive assembly 216 in its initial operating position shown in FIG. 23 provides a clearance cavity 237 between mandrel drive member 226 and stall driver 236. The same tool 20 used in conjunction with retractable prewinder apparatus 10 can also be used with prewinder drive assembly 216 by threadably inserting tool 20 into engagement with extended length thread portion 238 of body 234 until contact between tool 20, stall stop member 232, and shoulder stop 233 of body 234 occurs.

Referring to FIG. 24 and again to FIG. 23, mandrel drive member 226 includes a drive end shaft 240 having drive end 224 extending outwardly therefrom. A drive end shaft through-bore 242 is created through drive end shaft 240 to slidably receive first pin 228. Drive end shaft 240 extends from a raised shoulder 244 which itself extends from a drive member flange 246. Oppositely positioned with respect to drive end 224, a drive member body 248 having a substantially tubular shape extends away from drive member flange 246. Each of the components of mandrel drive member 226 can be integrally and homogeneously created by a casting, machining, or molding process from a single material component. Drive member body 248 has a body diameter "G". A body end face 249 creates a free end of drive member body 248. An elongated aperture 250 is created parallel with a drive member longitudinal axis 252. The longitudinal axis of drive end shaft through-bore 242 intersects drive member longitudinal axis 252.

Figure 25:
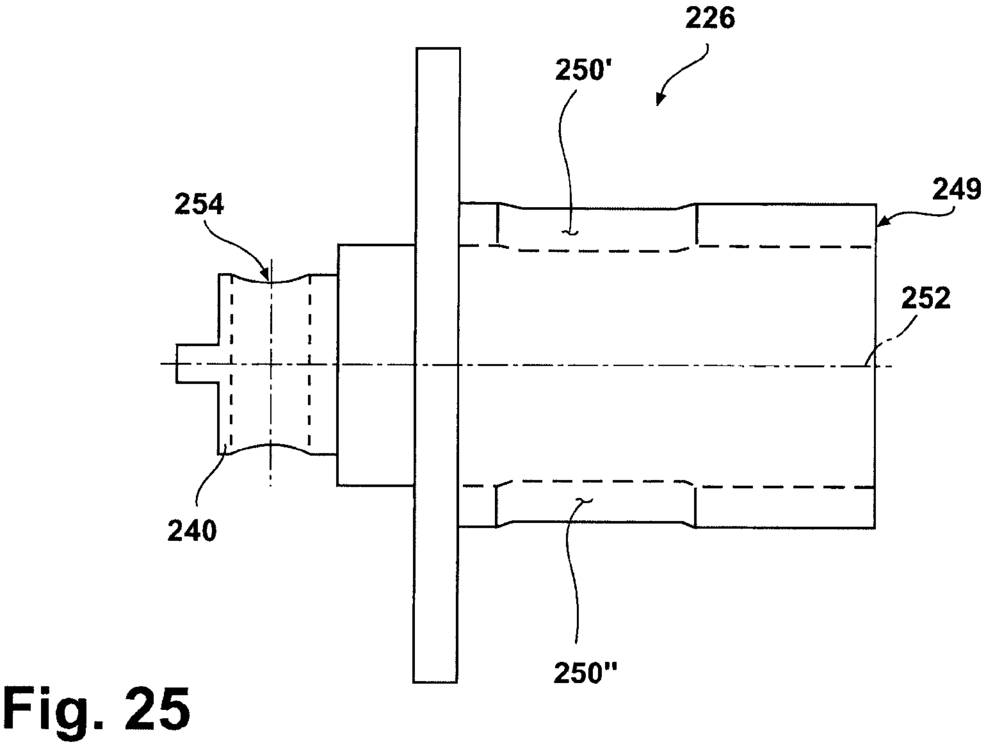
FIG. 25 is a front elevational view of the drive member of FIG. 24.

Referring to FIG. 25, a concave circumferential recess 254 can be created about a perimeter of drive end shaft 240. Elongated aperture 250 is a through-aperture created through opposing walls defining elongated aperture portions 250', 250". Body end face 249 is oriented substantially transverse to drive member longitudinal axis 252.

Figure 24:
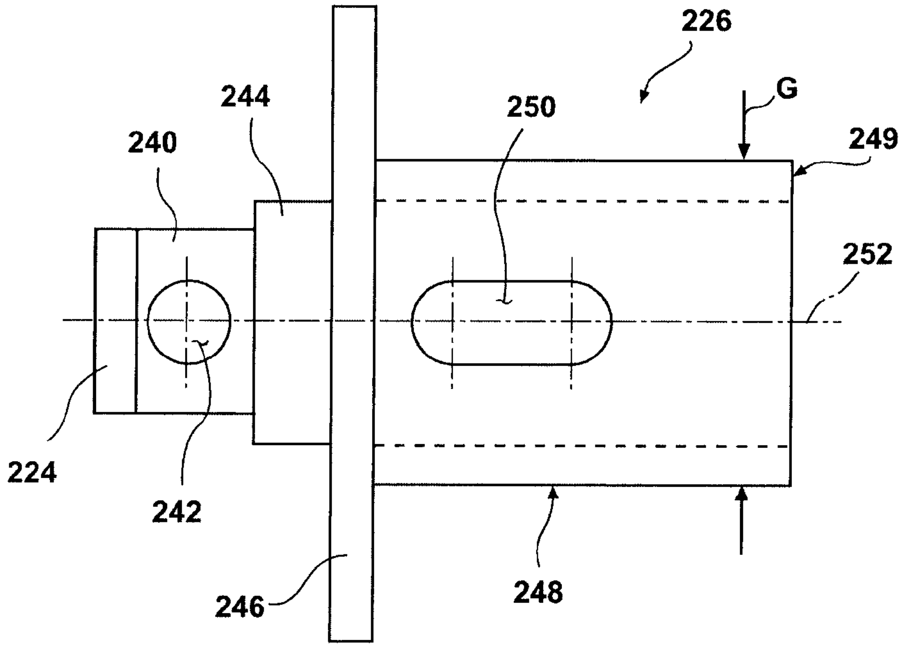
FIG. 24 is a top plan view of a drive member of the prewinder drive assembly of FIG. 23.

Referring to FIG. 26 and again to FIG. 24, stall sleeve 230 can be made from a generally tubular-shaped body 256 from a material such as a steel or polymeric material. A second elongated aperture 258 is created in tubular body 256 which is similarly sized with respect to elongated aperture 250 of mandrel drive member 226. A sleeve through-bore 260 extends throughout a length of stall sleeve 230. Second elongated aperture 258, similar to elongated aperture 250, is created as a through-aperture through opposing walls of tubular body 256 thereby defining first and second elongated aperture portions 258', 258". A threaded body end 262 is created at a free end of tubular body 256 having a tubular body end 263.

Referring to FIG. 27 and again to FIG. 24, second elongated aperture 258, as first and second aperture portions 258', 258" are created in a portion of tubular body 256 also including sleeve through-bore 260. First and second aperture portions 258', 258" are oriented in parallel with a stop member body longitudinal axis 264.

Figure 28:
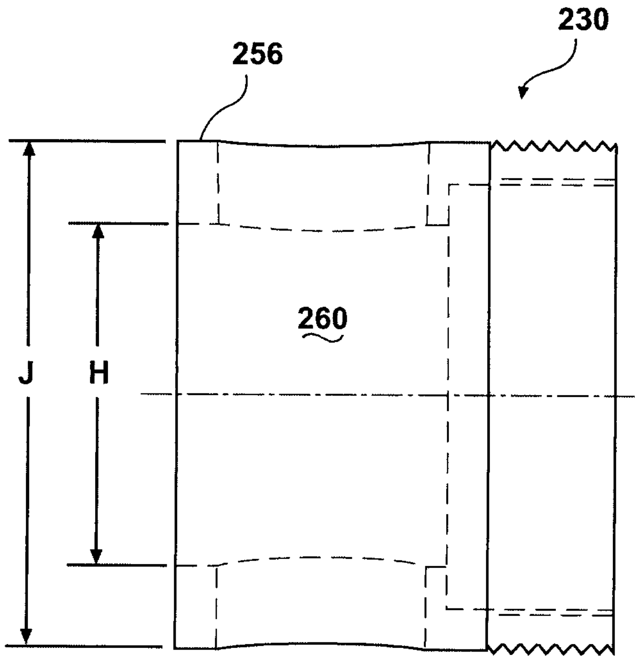
FIG. 28 is a front elevational view of the stall sleeve of FIG. 26.

Referring to FIG. 28 and again to FIG. 24, sleeve through-bore 260 has a bore diameter "H" which is adapted to slidably receive the drive member body 248 of mandrel drive member 226. Body diameter "G" of mandrel drive member 226 is therefore adapted to provide a sliding fit with respect to bore diameter "H". Sleeve tubular body 256 has a tubular body diameter "J".

Figure 27:
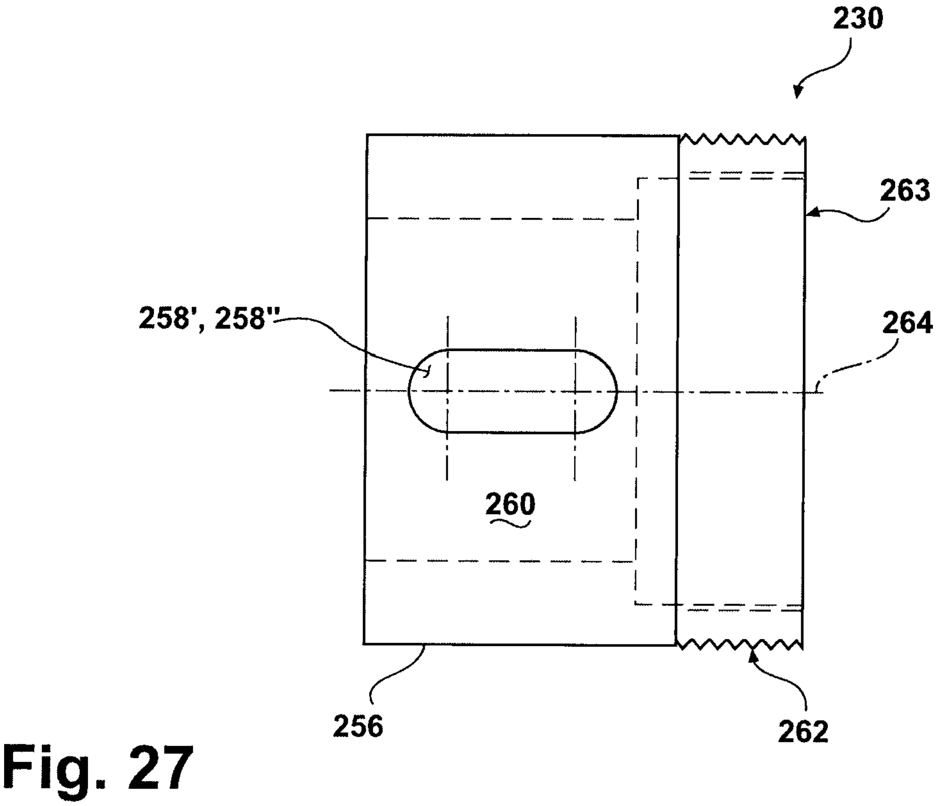
FIG. 27 is a top plan view of the stall sleeve of FIG. 26.
Figure 29:
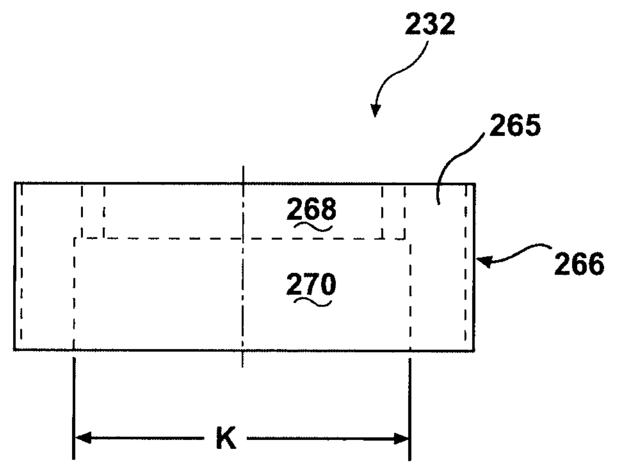
FIG. 29 is a top plan view of a stall stop member of the prewinder drive assembly of FIG. 23.
Figure 30:
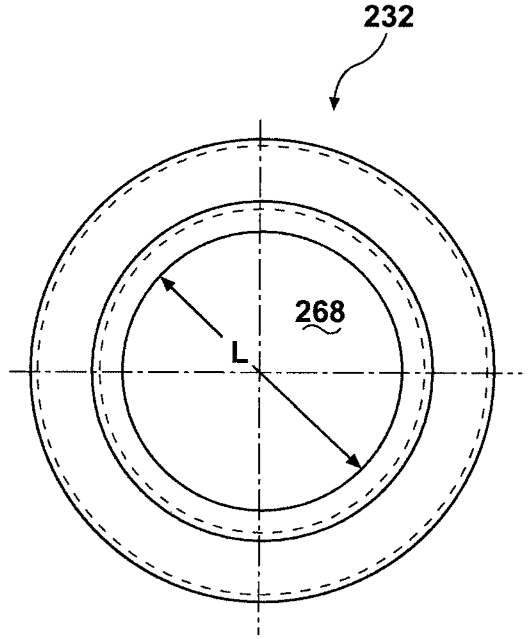
FIG. 30 is a front elevational view of the stall stop member of FIG. 29.

Referring to FIGS. 29 and 30 and again to FIGS. 23 and 27, stall stop member 232 includes a substantially tubular-shaped stop member body 265 having a continuously threaded perimeter 266. Threaded perimeter 266 is adapted to threadably engage with the extended length thread portion 238 of body 234. An internally threaded counterbore 268 and a clearance bore 270 are also created in interior spaces of stop member body 265. Clearance bore 270 has a clearance bore diameter "K". Threaded counterbore 268 has a counterbore diameter "L" which is adapted to threadably receive the threaded body end 262 of stall sleeve 230.

Figure 31:
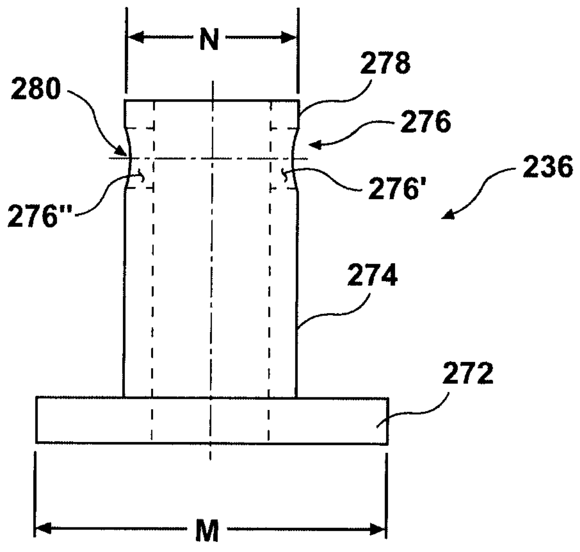
FIG. 31 is a top plan view of a stall driver of the prewinder drive assembly of FIG. 23.
Figure 32:
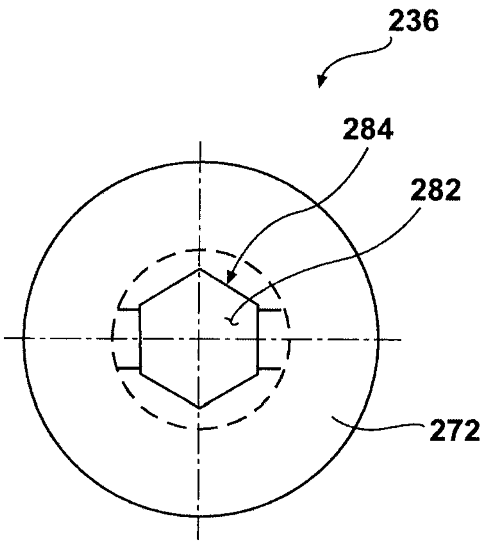
FIG. 32 is a front elevational view of the stall driver of FIG. 31.

Referring to FIGS. 31 and 32 and again to FIG. 23, stall driver 236 can be made from a single homogeneous piece of material such as a metal or a polymeric material and includes a driver flange 272 having a flange diameter "M". A driver body 274 having a generally tubular shape extends from driver flange 272 and includes a body diameter "N" which is smaller than flange diameter "M". A pin engagement aperture 276 is created as a through-aperture through opposing walls of driver body 274 defining first and second portions 276', 276" of pin engagement aperture 276. Pin engagement aperture 276 is created proximate to a driver body end 278. Pin engagement aperture 276 is sized to frictionally receive and retain second pin 239. A concave circumferential recess 280 can also be created about a perimeter of driver body 274 in parallel with a longitudinal axis of pin engagement aperture 276. The longitudinal axis of pin engagement aperture 276 is oriented substantially perpendicular to a longitudinal axis of driver body 274. A tool drive member receiving aperture 282 is adapted to receive a drive member (not shown) of tool 20. A plurality of aperture wall segments 284 defining a geometric shape matching the geometry of the tool engagement member are provided.

Figure 34:
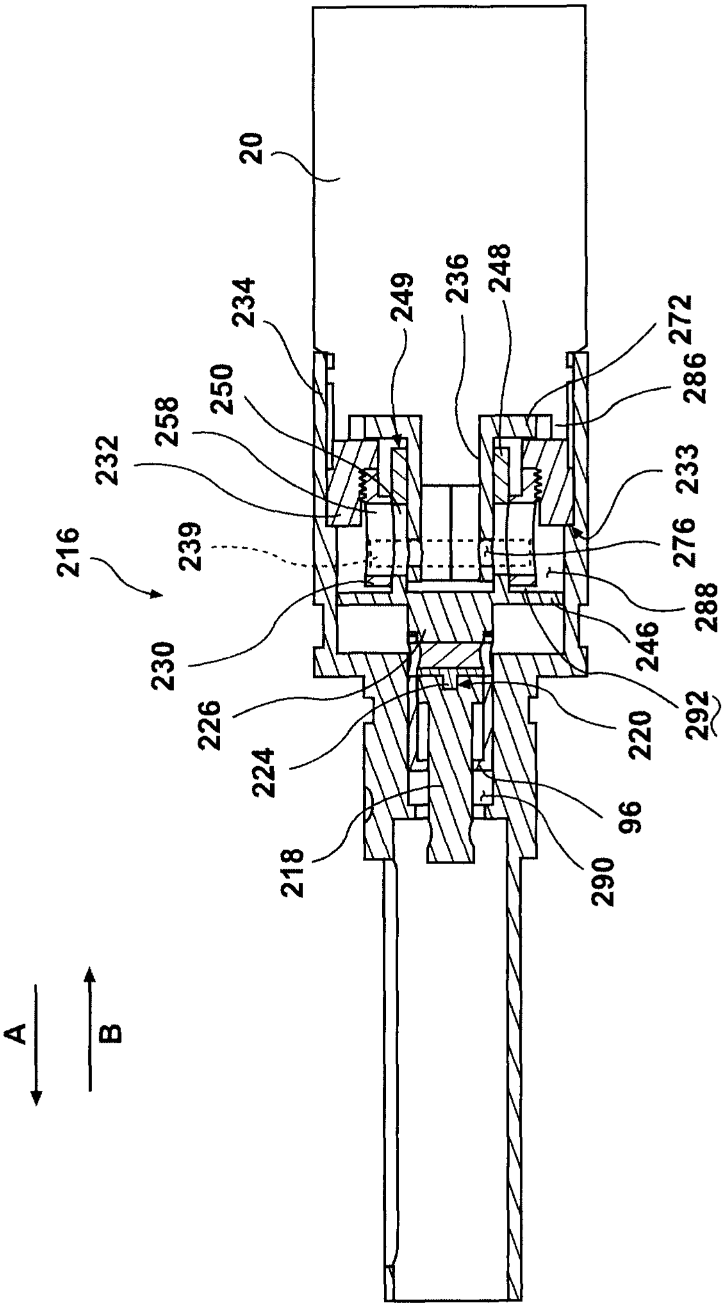
FIG. 34 is a cross sectional front elevational view taken at section 34 of FIG. 33.
Figure 33:
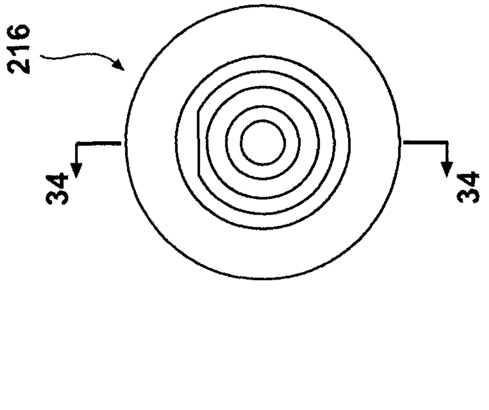
FIG. 33 is an end elevational view of the prewinder drive assembly of FIG. 23 in a stalled condition.

Referring to FIGS. 33 and 34 and again to FIG. 23, the operation of prewinder drive assembly 216 can be as follows. From the initial position of prewinder drive assembly 216 shown in FIG. 23, drive end 224 of mandrel drive member 226 is engaged within slot 220 of mandrel flange end 222. Second pin 239 is frictionally received within pin engagement aperture 276 of stall driver 236 having opposed ends of second pin 239 freely positioned within each of elongated aperture 250 of mandrel drive member 226 and second elongated aperture 258 of stall sleeve 230. Rotation of stall driver 236 by operation of tool 20 co-rotates each of stall sleeve 230 and mandrel drive member 226 by contact between second pin 239 with walls of elongated aperture 250 and second elongated aperture 258. Rotation of mandrel drive member 226 thereby rotates mandrel portion 218 using the connection between drive end 224 and mandrel flange end 222. Stall stop member 232 is fixed and non-rotatably positioned with respect to body 234 by engagement between the threaded perimeter 266 of stall stop member 232 and extended length thread portion 238. Mandrel portion 218 (together with its second portion, not shown) operates to install a helically coiled insert 18 (not shown in this view) in the assembly installation direction "A".

Figure 26:
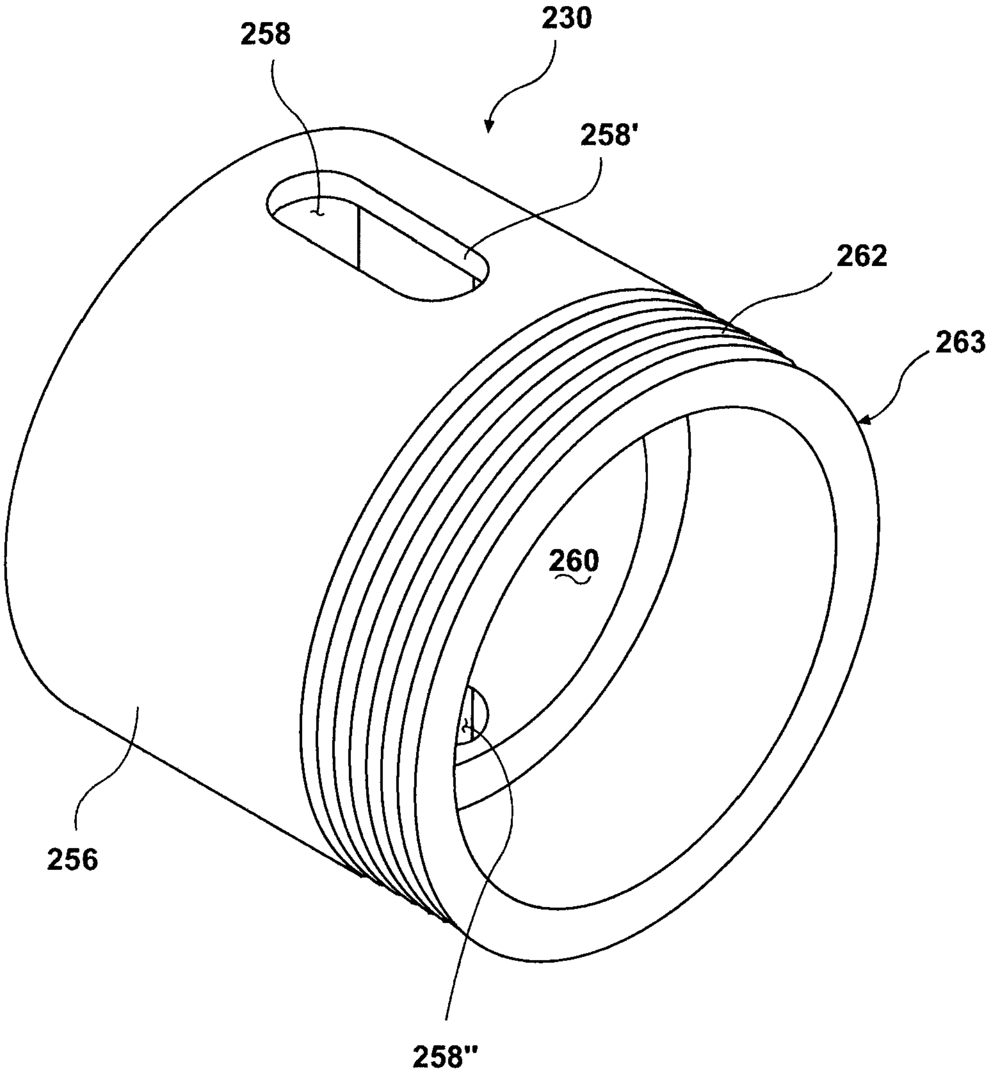
FIG. 26 is a front right perspective view of a stall sleeve of the prewinder drive assembly of FIG. 23.

Referring more specifically to FIG. 34 and again to FIGS. 1, 26, and 27, following insertion of the helically coiled insert 18 and automatic reverse rotation of tool 20, mandrel portion 218 is forced by displacement of its second mandrel portion (not shown) in the assembly contraction direction "B" which axially translates mandrel drive member 226 in the assembly contraction direction "B". The free ends of second pin 239 are repositioned within each of the elongated apertures 250 and second elongated apertures 258 as mandrel drive member 226 moves in the assembly contraction direction "B". A stall position is reached when the threaded body end 262 of stall sleeve 230 is fully threadably engaged with the threaded counterbore 268 of stall stop member 232 and the tubular body end 263 of stall sleeve 230 contacts the driver flange 272 of stall driver 236. At the same time, the body end face 249 of mandrel drive member 226 is physically separated from the driver flange 272 of stall driver 236 to allow full threaded engagement of the coarse threads of the threaded body end 262 of stall sleeve 230 with the coarse threads of threaded counterbore 268.

A length of second pin 239 can be controlled so that free ends of second pin 239 are retained within the extent of the wall thickness at first and second aperture portions 258', 258" of second elongated aperture 258 to preclude extension of second pin 239 into a body clearance cavity 288. This prevents contact of the free ends of second pin 239 from precluding rotation of the assembly. A cavity 286 between driver flange 272 of stall driver 236 and body 234 maintains clearance to the internal threads of body 234 permitting threaded engagement of stall stop member 232 with body 234. As mandrel drive member 226 translates in the assembly contraction direction "B" to reach the stall position, clutch tube end wall 96 also translates in the assembly contraction direction "B", creating a gap 290. In addition, translation of stall sleeve 230 in the assembly contraction direction "B" to reach the stall position creates a stall sleeve-to-flange clearance gap 292.

Figure 35:
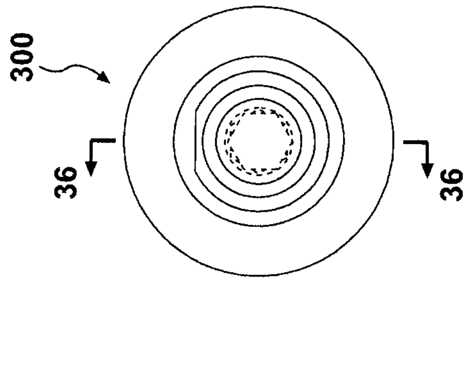
FIG. 35 is an end elevational view of another embodiment of a prewinder drive assembly of the present disclosure.

Referring to FIGS. 35 and 36, and again to FIG. 1, a disengagement mechanism or prewinder drive assembly 300 according another embodiment includes a main body portion 302 having a body 304 and a sleeve 306 extending axially with respect to body 304. A tubular portion 308 similar to tubular portion 65 shown in FIG. 1 extends axially from sleeve 306. Body 304 is adapted to engage with adapter 38 and prewinder portion 14 similar to body 42 of retractable prewinder apparatus 10.

A clutch tube or retaining sleeve 310 is slidably disposed within the extending sleeve 306. A retaining sleeve cavity 312 is created in a stalled position of the prewinder drive assembly 300 shown in FIG. 36. In the stalled position, the retaining sleeve 310 is slidably disposed in a direction "P" to create the retaining sleeve cavity 312. A receiving tube 314 is slidably received within retaining sleeve 310 and also within tubular portion 308. Sliding movement of retaining sleeve 310 concomitantly moves the receiving tube 314 in the direction "P". A mandrel first portion 315 (only partially shown) is connected to a mandrel extension 316 using a releasable connector 317 such as a pin. Mandrel extension 316 is slidably received through an opening of receiving tube 314 which includes an extension first end 318. A mandrel clip 320 is biased into contact about a perimeter of mandrel extension 316 to releasably connect the mandrel extension 316 to an inner body of a mandrel connecting member 322. A biasing member 321 such as a compression spring is positioned between mandrel connecting member 322 and receiving tube 314 to bias receiving tube 314 away from mandrel connecting member 322. Mandrel connecting member 322 is also slidably disposed within retaining sleeve 310. Axial displacement of the mandrel clip 320 therefore causes axial displacement of mandrel extension 316 as mandrel connecting member 322 is axially displaced.

Figure 36:
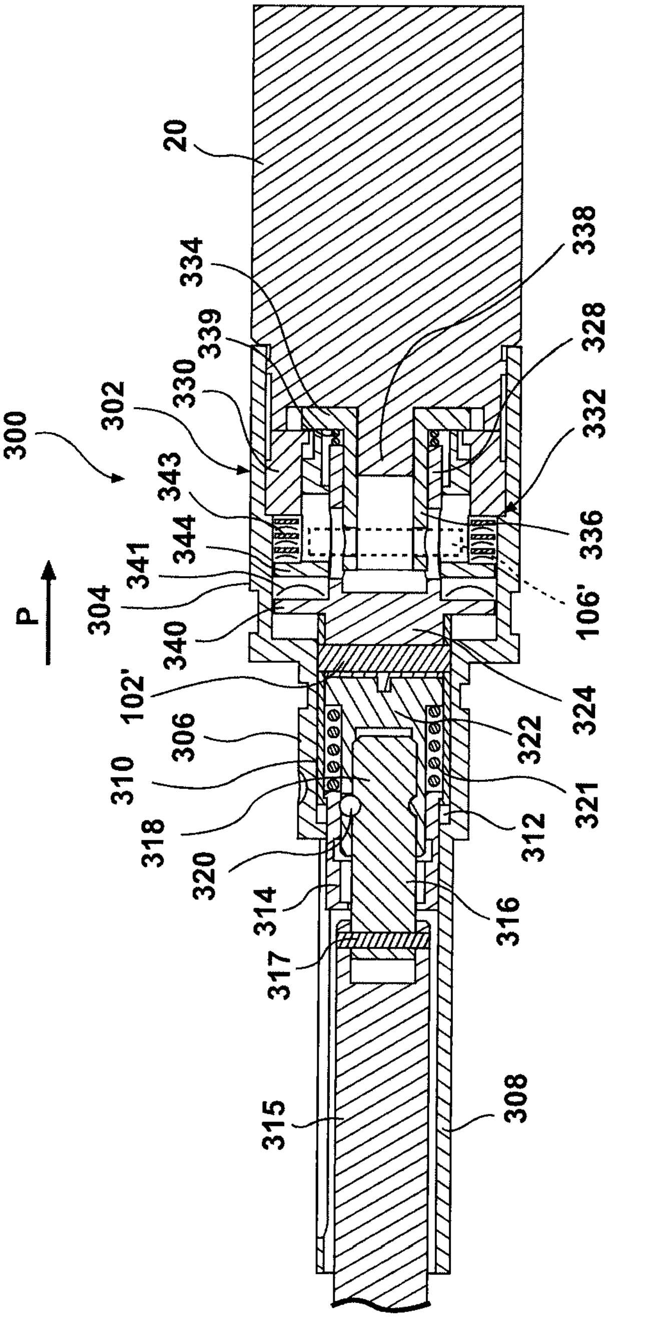
FIG. 36 is a cross sectional front elevational view taken at section 36 of FIG. 35, showing the drive assembly in a stalled position.

To the right of mandrel connecting member 322 as viewed in FIG. 36 is positioned a drive member 324. Drive member 324 engages the mandrell connecting member 322 similar to the connection of drive member 100 shown and described in reference to FIG. 1. First pin 102' releasably connects drive member 324 to retaining sleeve 310. Retaining sleeve 310 therefore co-rotates with rotation of drive member 324. Positioned in slidable contact with drive member 324 is a clutch sleeve or stall member 326 which is in slidable contact with a drive member cylindrical body 328 of drive member 324. A clutch or stall stop 330 is similar in design and function to the stall stop member 232 shown and described and reference to FIG. 34. Stall stop 330 is threadably engaged on an interior threaded portion of main body portion 302 until stall stop 330 contacts a shoulder stop 332 created in main body portion 302. Stall stop 330 can provide a stop point for the maximum axial displacement of stall member 326 in direction "P".

A flanged stall drive 334 having a stall drive tubular body 336 is slidably received in an interior diameter of drive member cylindrical body 328. Stall drive 334, stall member 326, and drive member 324 are together coupled using second pin 106' which is frictionally engaged in stall drive tubular body 336. Stall drive 334 is adapted to rotatably engage a tool drive member 338 extending from tool 20 such that rotation of tool drive member 338 co-rotates each of stall drive 334, stall member 326, drive member 324, mandrel connecting member 322, retaining sleeve 310, receiving tube 314, and mandrel extension 316. In the stalled position shown in FIG. 36, stall member 326 and stall stop 330 are translated in the direction "P" to a maximum extent to frictionally contact stall member 326, stall stop 330, and stall drive 334. This frictional contact acts to stall tool 20.

Biasing members such as springs are used to prevent prewinder drive assembly 300 from binding in the stalled position. A first biasing member 339 such as a compression spring is positioned between and biases apart flanged stall drive 334 and drive member cylindrical body 328 of drive member 324. A drive member flange 340 of drive member 324 and a stall member flange 344 of stall member 326 are biased apart by a second biasing member 341 such as a flat wave spring, and a third biasing member 343 such as a flat wave spring is compressed between stall member flange 344 and 330 in the stall position. In the stalled position, biasing members 339 and 345 are compressed.

Figure 37:
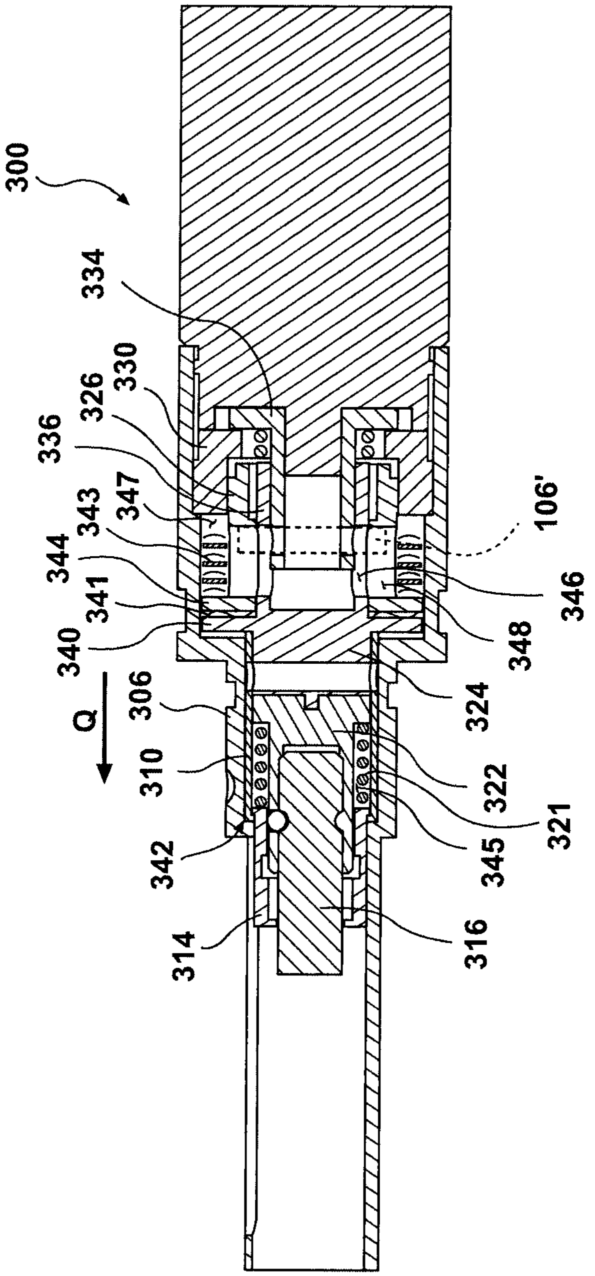
FIG. 37 is the cross sectional front elevational view of FIG. 36 showing the drive assembly in a drive position.

Referring to FIG. 37, a drive position of prewinder drive assembly 300 is shown. In the drive position both drive member 324 and stall member 326 are displaced in a direction "Q" such that drive member flange 340 of drive member 324 and stall member flange 344 of stall member 326 move together in the direction "Q" also forcing retaining sleeve 310 to move in direction "Q" until retaining sleeve 310 contacts stop face 342 of extending sleeve 306. In the drive position shown, both stall drive tubular body 336 and stall member 326 are spatially separated from stall stop 330 and therefore are allowed to spin freely. Contact between retaining sleeve 310 and stop face 342 provides an axial stop for the axial displacement of drive member 324 in the direction "Q", while continuing to allow rotation of retaining sleeve 310 with respect to extending sleeve 306 and rotation of mandrel extension 316. Mandrel connecting member 322 will continue to axially displace in direction "Q" until mandrel connecting member 322 disengages from drive member 324. A clearance cavity 345 permits the continued axial displacement in the direction "Q" of mandrel connecting member 322 and mandrel extension 316 until the maximum insertion depth of helically coiled insert 18 is reached as described in reference to FIG. 1. Biasing member 321 is positioned within clearance cavity 345 as previously discussed to bias receiving tube 314 in the direction "Q" and away from mandrel connecting member 322.

In the drive position the second pin 106', which is engaged with stall drive tubular body 336 of stall drive 334, is axially displaceable in an elongated aperture 346 of drive member 324 and also in an elongated aperture 348 created in stall member 326 which is coaxially aligned with elongated aperture 346. Also in the drive position first biasing member 339 is partially compressed and second biasing member 341 is fully compressed, and a clearance space 347 between third biasing member 343 and stall stop 330 allows full expansion of third biasing member 343.

Figure 38:
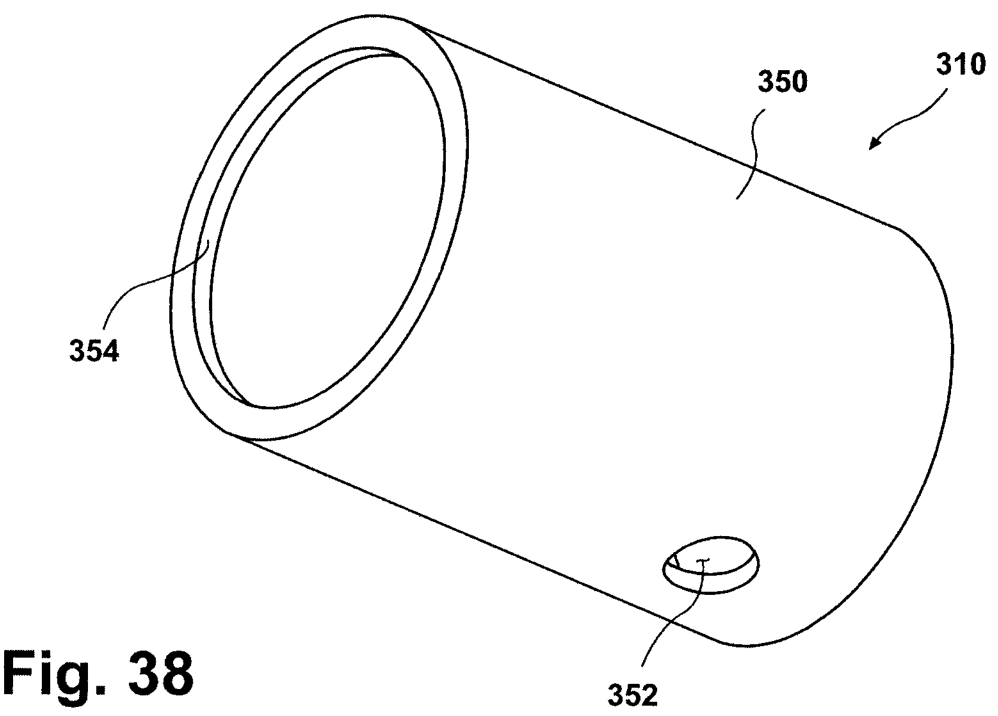
FIG. 38 is a front perspective view of a retaining sleeve for the prewinder drive assembly of FIG. 35.

Referring to FIG. 38, retaining sleeve 310 includes a tubular body 350 having a pin retaining aperture 352 oriented perpendicular to tubular body 350. With further reference to FIG. 36, pin retaining aperture 352 is adapted to frictionally receive first pin 102'. A body end wall 354 extends radially inwardly with respect to tubular body 350 to create an inner flange adapted to contact a corresponding outwardly directed radial flange of receiving tube 314 shown in FIG. 36.

Figure 39:
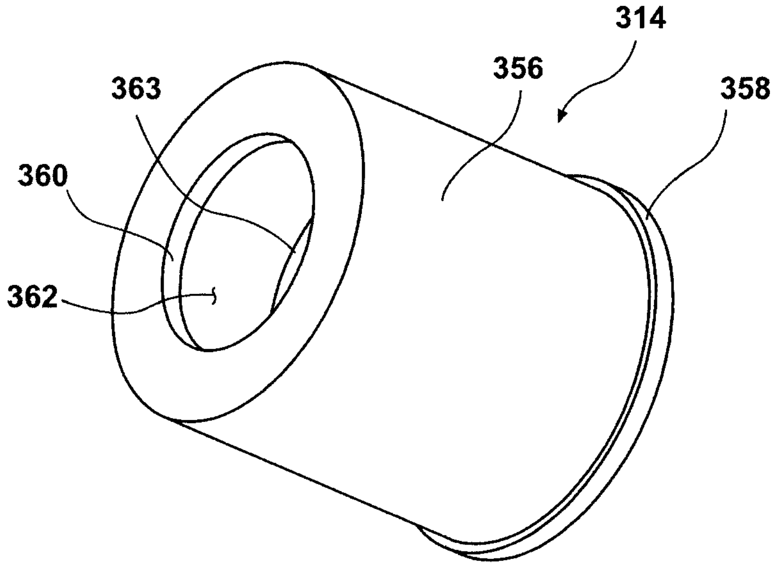
FIG. 39 is a front perspective view of a retainer for the prewinder drive assembly of FIG. 35.

Referring to FIG. 39, receiving tube 314 includes a receiving tube body 356 which is generally tubular in shape having a raised radially outwardly extending raised radial flange 358 positioned at a first end thereof. A tube body end wall 360 is created at an opposite second end of receiving tube body 356 with respect to raised radial flange 358. With further reference to FIG. 36, the tube body end wall 360 extends radially inwardly from receiving tube body 356 and is adapted to slidably receive the mandrel extension 316 in a through-aperture 362 defined by tube body end wall 360. An inner circumferential slot 363 can also be provided on an inner wall of receiving tube body 356. With reference again to FIG. 38, the raised radial flange 358 is adapted to contact body end wall 354 of retaining sleeve 310 such that axial displacement of retaining sleeve 310 will coaxially extend receiving tube 314.

Figure 40:
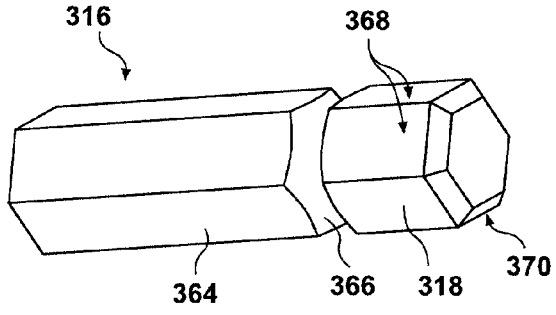
FIG. 40 is a front perspective view of a mandrel extension for the prewinder drive assembly of FIG. 35.

Referring to FIG. 40, mandrel extension 316 provides extension first end 318 and an extension second end 364. A neck portion 366 is created by circumferentially removing material from mandrel extension 316 to delineate the extension first end 318 from the extension second end 364. Neck portion 366 with further reference to FIG. 36 is adapted to receive the mandrel clip 320. According to several embodiments mandrel extension 316 is provided with multiple facetted perimeter faces 368 to create a geometric shape such as a hexagon or an octagon. The facetted perimeter faces 368 are adapted to translate rotational torque as mandrel extension 316 is rotated. A chamfered end 370 can also be provided at a free end of extension first end 318 and similarly if desired to a free end of extension second end 364 (not shown) to permit sliding displacement of mandrel extension 316 during installation or removal.

Figure 41:
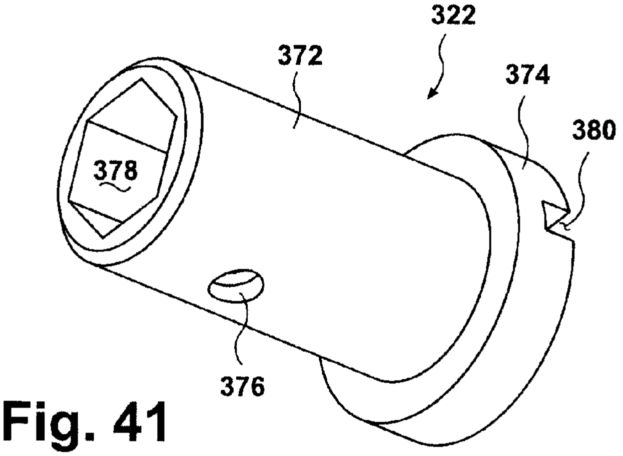
FIG. 41 is a front perspective view of a connecting member for the prewinder drive assembly of FIG. 35.

Referring to FIG. 41, mandrel connecting member 322 includes a connecting member tubular body 372 having a flange end 374 radially extending outwardly with respect to connecting member tubular body 372 and defining a first end of connecting member tubular body 372. A pin receiving aperture 376 is perpendicularly oriented with respect to connecting member tubular body 372. A hex drive aperture 378 is provided to slidingly receive the facetted perimeter faces 368 shown and described with reference to FIG. 40 of the mandrel extension 316. Rotation of mandrel connecting member 322 therefore functions to rotate mandrel extension 316. A slot 380 is created perpendicularly to flange end 374 and connecting member tubular body 372 and functions similarly to slot 101 shown and described in reference to FIG. 1.

Figure 42:
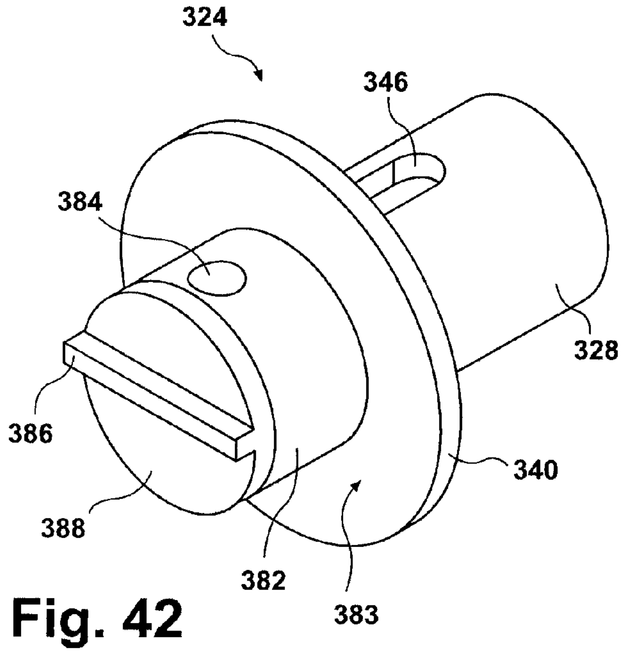
FIG. 42 is a front perspective view of a drive member for the prewinder drive assembly of FIG. 35.

Referring to FIG. 42, drive member 324 includes elongated apertures 346, 346' (aperture 346' is oppositely positioned and not visible in this view) created through drive member cylindrical body 328. Elongated apertures 346, 346' at one end abut the drive member flange 340. A raised shoulder 382 extends substantially transversely with respect to a flange end wall 383 of drive member flange 340. A drive end shaft through-bore 384 is created perpendicularly with respect to raised shoulder 382 which is adapted to frictionally receive first pin 102' shown and described in reference to FIG. 36. A drive end 386 is created as an extension from drive end wall 388 of raised shoulder 382. With further reference to FIG. 41 and FIG. 36, drive end 386 is adapted to be received in the slot 380 of mandrel connecting member 322 such that rotation of drive member 324 co-rotates mandrel connecting member 322.

Figure 43:
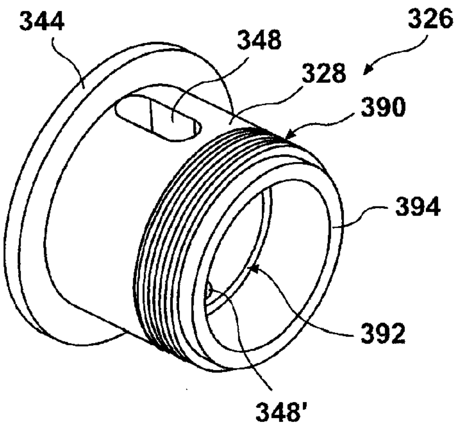
FIG. 43 is a front perspective view of a clutch sleeve for the prewinder drive assembly of FIG. 35.

Referring to FIG. 43, the stall member 326 includes elongated apertures 348, 348' created in opposing wall portions of drive member cylindrical body 328. One end of each of the elongated apertures 348, 348' abuts the stall member flange 344 which is positioned at a first end of stall member 326. An outside diameter threaded body end 390 is created proximate to an opposed second end of drive member cylindrical body 328. An inner body raised portion 392 provides additional wall thickness through drive member cylindrical body 328 for the elongated apertures 348, 348'. A reduced diameter body end 394 defines the free end portion of the second end of drive member cylindrical body 328.

Figure 44:
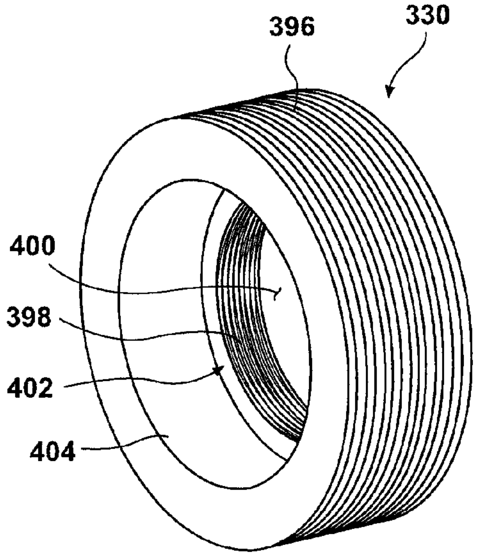
FIG. 44 is a front perspective view of a clutch stop for the prewinder drive assembly of FIG. 35.

Referring to FIG. 44 and again to FIGS. 36 and 43, stall stop 330 includes an outside diameter threaded body 396 and includes an inner diameter threaded body portion 398 proximate a first end thereof. Inner diameter threaded body portion 398 defines an aperture 400 and is adapted to threadably receive the outside diameter threaded body end 390 of stall member 326. The outside diameter threaded body 396 is adapted to be threadably connected to the interior threaded portion of main body portion 302. A stop face 402 of stall stop 330 is created at an interior facing end of threaded body portion 398. Stop face 402 is oriented substantially transverse to a longitudinal axis of cylindrical threaded body 396 defined by the aperture 400, and extends inwardly with respect to a body inner wall 404, and has a diameter larger than a diameter of aperture 400.

Figure 45:
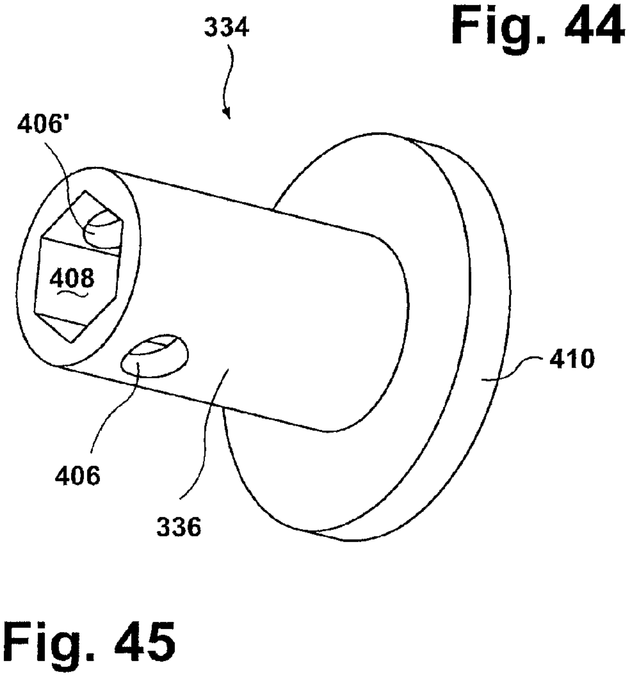
FIG. 45 is a front perspective view of a stall drive for the prewinder drive assembly of FIG. 35.

Referring to FIG. 45, the stall drive 334 includes opposed pin engagement apertures 406, 406' which are oriented transversely with respect to stall drive tubular body 336. Pin engagement apertures 406, 406' are adapted to frictionally engage second pin 106' as shown and described in reference to FIG. 36. A hex drive aperture 408 is longitudinally created through stall drive tubular body 336 and is adapted to receive tool drive member 338 shown and described in reference to FIG. 36. A radial flange 410 extends outwardly and transversely with respect to stall drive tubular body 336 and as shown in reference to FIG. 36 creates a stop surface for stall member 326 in the stalled position of prewinder drive assembly 300.

The retractable prewinders of the present disclosure offer several advantages. By adapting the prewinder portion 14 for slidable insertion into body 42 in lieu of fixing the prewinder portion 14 to the body 42, the axial displacement of prewinder portion 14 can be used to accurately control a depth of insertion of the helically coiled insert 18. By providing threaded insert 61 which axially translates by rotation of adapter 38 and is therefore infinitely adjustable, an unlimited number of positive stop positions for prewinder portion 14 are created. By using a first clutch to disengage the mandrel 16 from the drive portion of the prewinder assembly when the helically coiled insert 18 is fully inserted, and using either a second clutch assembly or a stall assembly to stall the tool 20 when the mandrel 16 is fully retracted, fully powered insertion and automatic retraction operations are provided.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A prewinder apparatus attached to a drive tool for installation of a helical coil insert, the prewinder apparatus comprising:

a body connected to the drive tool;

an adapter rotatable with respect to the body and releasably connected to the body at operator selected ones of a plurality of rotated positions, the adapter having a plurality of insert engagement threads created on an internal diameter of the adapter and a longitudinal cavity;

a prewinder portion slidably displaceable into and out of the body coaxial to a longitudinal axis of the body and the adapter, and biased by a first biasing member toward an extended position;

a mandrel axially extensible from the prewinder portion when the prewinder portion is slidably displaced into the body against a biasing force of the first biasing member, the mandrel adapted to engage the helical coil insert to rotatably insert the coil insert; and a threaded insert having outwardly facing threads engaged with the insert engagement threads, the threaded insert non-rotatably retained within the longitudinal cavity of the adapter allowing infinitely adjustable axial displacement of the threaded insert in the longitudinal cavity by rotation of the adapter causing engagement of the insert threads with the insert engagement threads to longitudinally displace the threaded insert.

2. The prewinder apparatus of claim 1, further including:

a flat surface portion of the adapter defining an elongated cavity within the adapter; and a fastener engaged with the prewinder portion having a fastener head axially movable within the elongated cavity.

3. The prewinder apparatus of claim 2, wherein the threaded insert at any location within the longitudinal cavity creates a stop position for axial travel of the prewinder portion by contact within the longitudinal cavity between the fastener head and the threaded insert, the stop position further defining a depth of insertion of the coil insert.

4. The prewinder apparatus of claim 2, further including an end wall of the adapter wherein the prewinder portion is retained partially in the body at the extended position by contact with the end wall of the adapter.

5. The prewinder apparatus of claim 1, wherein the mandrel further includes:

a flange end; and a slot created in the flange end.

6. The prewinder apparatus of claim 5, further including a first clutch assembly having:

a clutch tube slidably received in the body and releasably retained by contact with a contact wall of the body, the clutch tube having an end wall;

a drive member releasably connected to the clutch tube, the drive member having a male drive end releasably engaged within the slot in the flange end of the mandrel to rotate the mandrel by rotation of the drive member using a motive force of the drive tool; and a second biasing member received in the clutch tube contacting the flange end of the mandrel and the end wall of the clutch tube and acting to bias the flange end of the mandrel toward the male drive end of the drive member, the mandrel releasable from the drive member by axial extension of the mandrel causing compression of the second biasing member when the helically coiled insert reaches an installed position.

7. The prewinder apparatus of claim 1, further including:

a first clutch assembly adapted to allow coupling/de-coupling of the mandrel from the drive tool; and a second clutch assembly adapted to stall the drive tool following installation of the coil insert.

8. The prewinder apparatus of claim 7, wherein the second clutch assembly includes:

a stall sleeve having a plurality of inner cavity threads;

a stall coupling being both slidably and threadably receivable within an inner bore of a stall sleeve and further including a plurality of outer perimeter threads adapted to be threadably engaged with the plurality of inner cavity threads of the stall sleeve; and a drive socket axially translatable within the stall coupling;

wherein upon full threaded engagement of the outer perimeter threads with the inner cavity threads an end face of the stall coupling contacts an interior wall face of the stall sleeve preventing further axial translation of the stall coupling to frictionally stall the drive tool.

9. The prewinder apparatus of claim 1, wherein the mandrel includes a threaded first end adapted to be threadably received in a threaded longitudinal aperture of the mandrel portion, rotation of the mandrel with respect to the threaded longitudinal aperture acting to drive the prewinder portion either into or out of the body.

10. The prewinder apparatus of claim 1, wherein the prewinder portion is slidably translatable into the body until a fastener engaged with the prewinder portion contacts a stop member defining a predetermined depth of insertion for the helically coiled insert, and wherein the prewinder portion is extendable out of the body until the fastener contacts an end wall of the adapter.

11. The prewinder apparatus of claim 1, further comprising at least one adapter fastener received through the adapter having a shank, the shank adapted to slidably fit into a circumferential ring of the body in a first condition to allow the adapter to rotate with respect to the body, and the shank adapted when fully engaged in frictional contact with the body in a second condition to nonrotatably fix the adapter to the body.

12. A prewinder apparatus attached to a drive tool for installation of a helical coil insert, the prewinder apparatus comprising:

a body connected to the drive tool;

a mandrel axially extensible from the body, the mandrel adapted to engage the helical coil insert to rotatably insert the coil insert;

a drive member releasably engaged to the mandrel and adapted to rotate the mandrel;

a clutch assembly including:

a stall sleeve having a plurality of inner cavity threads;

a stall coupling being both slidably and threadably receivable within an inner bore of the stall sleeve and further including a plurality of outer perimeter threads adapted to be threadably engaged with the plurality of inner cavity threads of the stall sleeve; and a drive socket connected for rotation to the drive tool and axially translatable within the stall coupling; and a prewinder portion slidably displaceable into and out of the body coaxial to a longitudinal axis of the body and biased by a first biasing member toward an extended position;

wherein upon full threaded engagement of the outer perimeter threads with the inner cavity threads an end face of the stall coupling contacts a wall of the stall sleeve preventing further axial translation of the stall coupling to frictionally stall the drive tool.

13. The prewinder apparatus of claim 12, wherein the stall coupling includes at least one biasing member positioned within the stall coupling adapted to bias the stall coupling axially away from the drive member.

14. The prewinder apparatus of claim 13, wherein the drive socket further includes an engagement flange radially extending outwardly from the drive socket defining a contact wall for the at least one biasing member.

15. The prewinder apparatus of claim 14, wherein the engagement flange includes a plurality of extending keys integrally extending from an outer perimeter of the engagement flange, individual ones of the plurality of extending keys adapted to be slidably received in each of a plurality of longitudinal slots created on an inner wall of the stall coupling allowing the drive socket to slidably translate within the stall coupling while simultaneously causing the stall coupling to co-rotate together with the drive socket.

16. A prewinder apparatus attached to a drive tool for installation of a helical coil insert, the prewinder apparatus comprising:

a body connected to the drive tool;

a mandrel axially extensible from the body, the mandrel adapted to engage the helical coil insert to rotatably insert the coil insert;

a drive member releasably engaged to the mandrel and adapted to rotate the mandrel;

a clutch assembly including:

a stall sleeve having a plurality of inner cavity threads;

a stall coupling being both slidably and threadably receivable within an inner bore of the stall sleeve and further including a plurality of outer perimeter threads adapted to be threadably engaged with the plurality of inner cavity threads of the stall sleeve; and a drive socket connected for rotation to the drive tool and axially translatable within the stall coupling;

wherein upon full threaded engagement of the outer perimeter threads with the inner cavity threads an end face of the stall coupling contacts a wall of the stall sleeve preventing further axial translation of the stall coupling to frictionally stall the drive tool; and an adapter rotatable with respect to the body and releasably connected to the body at operator selected ones of a plurality of rotated positions.

17. A prewinder apparatus attached to a drive tool for installation of a helical coil insert, the prewinder apparatus comprising:

a body connected to the drive tool;

a prewinder portion movable with respect to the body;

a mandrel axially extensible from the prewinder portion, the mandrel adapted to engage the helical coil insert to rotatably insert the coil insert;

a drive system adapted to rotate the mandrel and translate the mandrel in each of an installation direction and a retraction direction;

a disengagement mechanism adapted to disengage the mandrel from the drive system when the helical coil insert reaches an installed position by translation of the mandrel in the installation direction, the disengagement mechanism adapted to stop rotation of the mandrel when the mandrel is retracted in the retraction direction to a fully retracted position; and an adapter rotatable with respect to the body and releasably connected to the body at operator selected ones of a plurality of rotated positions.

18. The prewinder apparatus of claim 17, wherein the prewinder portion is partially received in the adapter and is slidably and axially displaceable with respect to the adapter toward and away from the body coaxial to a longitudinal axis of the body and the adapter.

19. The prewinder apparatus of claim 18, wherein the prewinder portion is slidably translatable toward the body until a fastener engaged with the prewinder portion contacts a stop member threadably received in the adapter defining a predetermined depth of insertion for the helical coil insert.

* * * * *